(12) United States Patent
Farnworth

(10) Patent No.: US 7,239,932 B2
(45) Date of Patent: Jul. 3, 2007

(54) METHODS AND APPARATUS FOR CALIBRATING PROGRAMMABLE MATERIAL CONSOLIDATION APPARATUS

(75) Inventor: Warren M. Farnworth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 153 days.

(21) Appl. No.: 10/705,394

(22) Filed: Nov. 10, 2003

(65) Prior Publication Data

US 2004/0153193 A1 Aug. 5, 2004

Related U.S. Application Data

(60) Provisional application No. 60/425,567, filed on Nov. 11, 2002.

(51) Int. Cl.
*G06F 19/00* (2006.01)
*B29C 35/04* (2006.01)
*G01L 25/00* (2006.01)

(52) U.S. Cl. ............... 700/118; 700/119; 700/120; 264/401; 702/105

(58) Field of Classification Search ........ 700/118–120; 264/401; 438/106; 702/105
See application file for complete search history.

(56) References Cited

U.S. PATENT DOCUMENTS

| | | | |
|---|---|---|---|
| 3,889,355 A | 6/1975 | Aronstein et al. | |
| 4,027,246 A | 5/1977 | Caccoma et al. | |
| 4,526,646 A | 7/1985 | Suzuki et al. | |
| 4,543,659 A | 9/1985 | Ozaki | |
| 4,728,252 A | 3/1988 | Lada et al. | |
| 4,736,437 A | 4/1988 | Sacks et al. | |
| 4,899,921 A | 2/1990 | Bendat et al. | |
| 5,059,559 A | 10/1991 | Takahashi et al. | |
| 5,113,565 A | 5/1992 | Cipolla et al. | |
| 5,123,734 A * | 6/1992 | Spence et al. ............ | 356/121 |
| 5,143,663 A | 9/1992 | Leyden et al. | |

(Continued)

FOREIGN PATENT DOCUMENTS

DE 19952998 5/2001

(Continued)

OTHER PUBLICATIONS

International Search Report dated May 12, 2004 (6 pages).

(Continued)

*Primary Examiner*—Alexander Kosowski
(74) *Attorney, Agent, or Firm*—TraskBritt

(57) ABSTRACT

A programmed material consolidation apparatus includes at least one fabrication site and a material consolidation system associated with the at least one fabrication site. The at least one fabrication site may be configured to receive one or more fabrication substrates, such as semiconductor substrates. A machine vision system with a translatable or locationally fixed camera may be associated with the at least one fabrication site and the material consolidation system. A cleaning component may also be associated with the at least one fabrication site. The cleaning component may share one or more elements with the at least one fabrication site, or may be separate therefrom. The programmed material consolidation apparatus may also include a substrate handling system, which places fabrication substrates at appropriate locations of the programmed material consolidation apparatus.

27 Claims, 9 Drawing Sheets

U.S. PATENT DOCUMENTS

| | | | |
|---|---|---|---|
| 5,174,931 A | 12/1992 | Almquist et al. | |
| 5,238,174 A | 8/1993 | Ricketson et al. | |
| 5,287,435 A * | 2/1994 | Cohen et al. | 345/418 |
| 5,288,698 A | 2/1994 | Banjo et al. | |
| 5,460,758 A | 10/1995 | Langer et al. | |
| 5,463,227 A | 10/1995 | Stern et al. | |
| 5,482,659 A | 1/1996 | Sauerhoefer | |
| 5,506,684 A | 4/1996 | Ota et al. | |
| 5,508,489 A | 4/1996 | Benda et al. | |
| 5,516,023 A | 5/1996 | Kono | |
| 5,516,026 A | 5/1996 | Ariye et al. | |
| 5,573,721 A | 11/1996 | Gillette | |
| 5,622,811 A | 4/1997 | Ogue et al. | |
| 5,644,245 A | 7/1997 | Saitoh et al. | |
| 5,789,890 A | 8/1998 | Genov et al. | |
| 5,871,391 A * | 2/1999 | Pryor | 451/9 |
| 6,021,358 A | 2/2000 | Sachs | |
| 6,158,346 A | 12/2000 | Zhang | |
| 6,336,204 B1 | 1/2002 | Jevtic | |
| 6,337,122 B1 | 1/2002 | Grigg et al. | |
| 6,463,349 B2 | 10/2002 | White et al. | |
| 6,483,596 B1 * | 11/2002 | Philippi et al. | 356/614 |
| 2001/0032111 A1 | 10/2001 | Jensen et al. | |
| 2002/0090410 A1 | 7/2002 | Tochimoto et al. | |
| 2003/0114016 A1 | 6/2003 | Tischler | |
| 2003/0173713 A1 | 9/2003 | Huang | |
| 2004/0251242 A1 * | 12/2004 | Suh | 219/121.63 |

FOREIGN PATENT DOCUMENTS

| | | |
|---|---|---|
| JP | 56151516 | 11/1981 |
| JP | 08150662 | 6/1996 |
| JP | 2000263603 | 9/2000 |
| WO | WO 97/17664 | 5/1997 |
| WO | WO-9717664 | 5/1997 |

OTHER PUBLICATIONS

European Search Report dated Aug. 17, 2005 (5 pages).

* cited by examiner

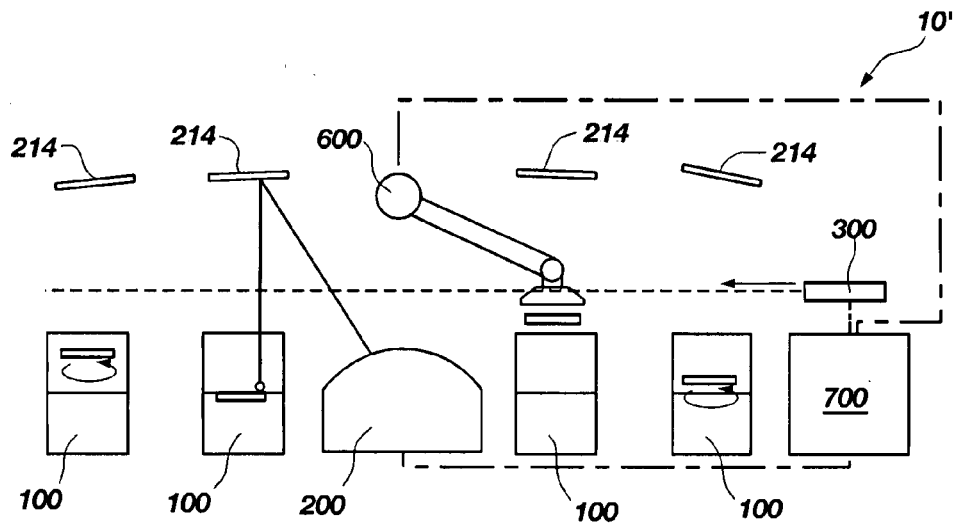
FIG. 2
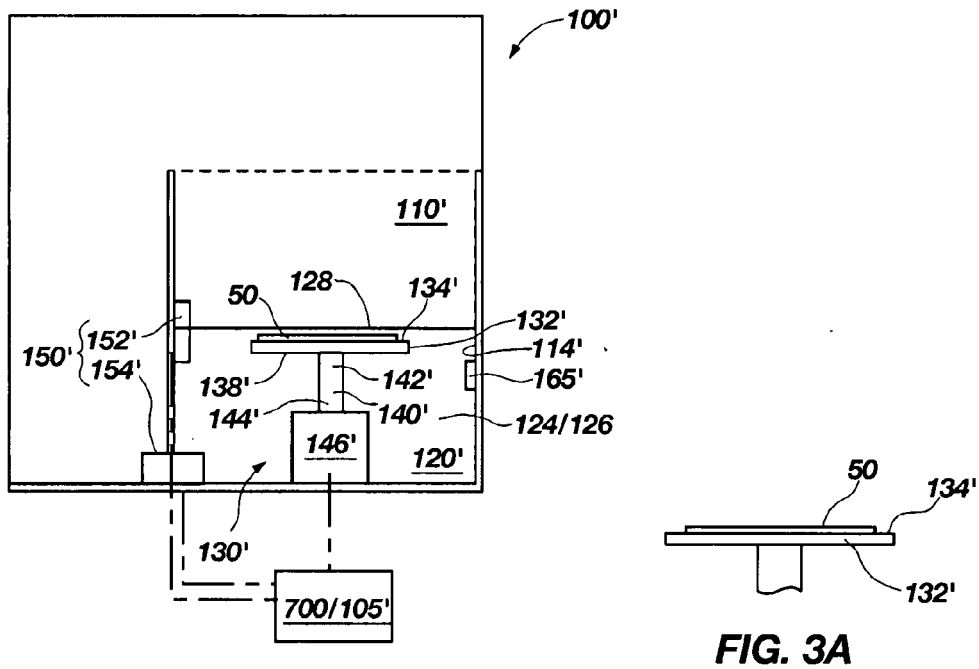
FIG. 3
FIG. 3A
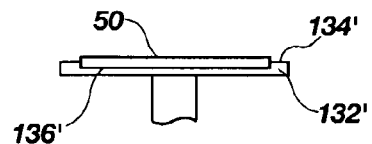
FIG. 3B

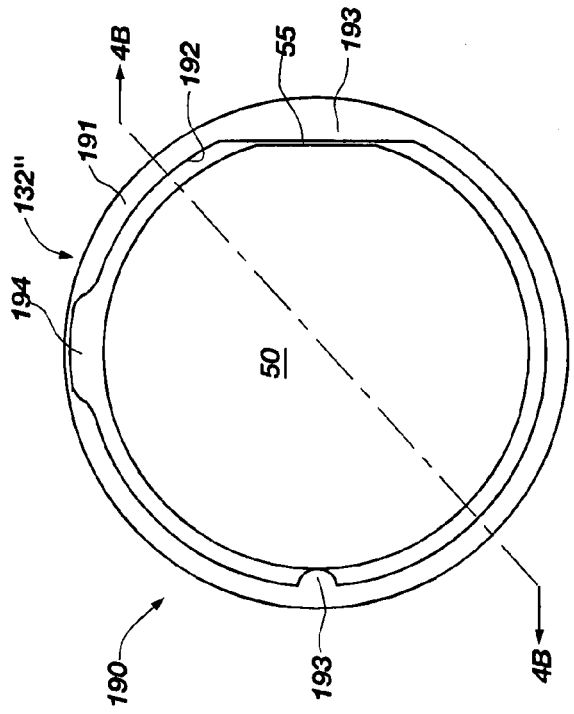
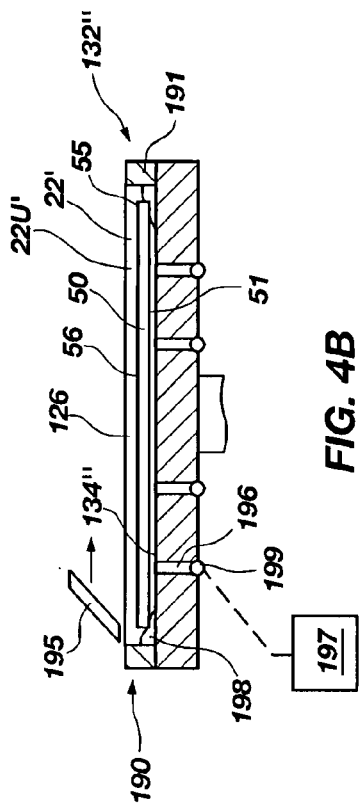
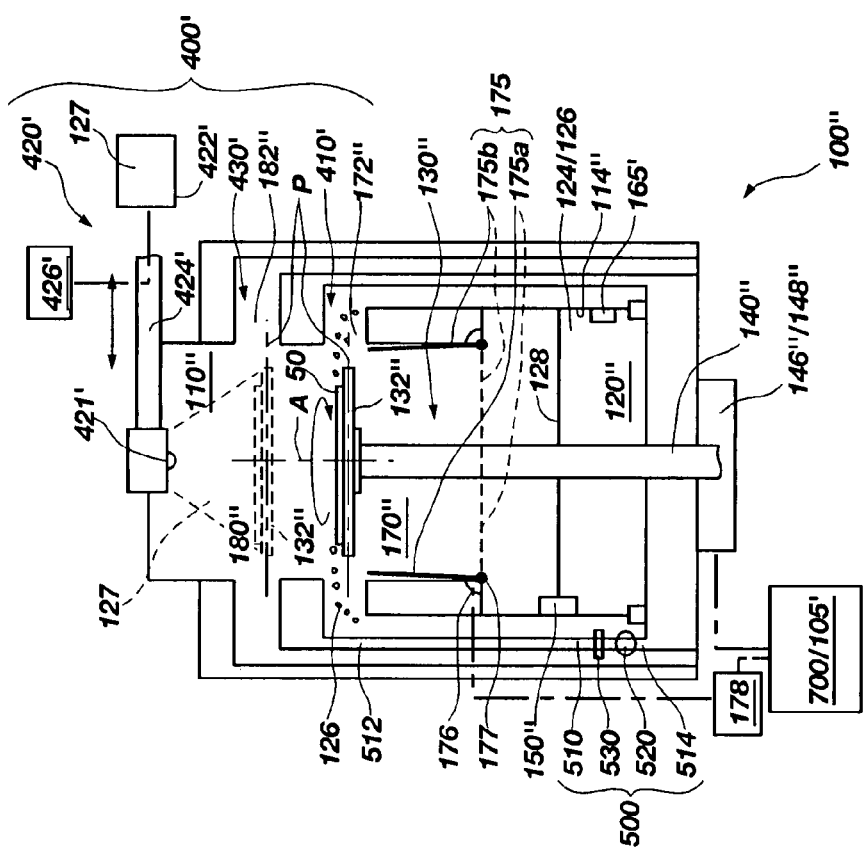

FIG. 4D         FIG. 4E

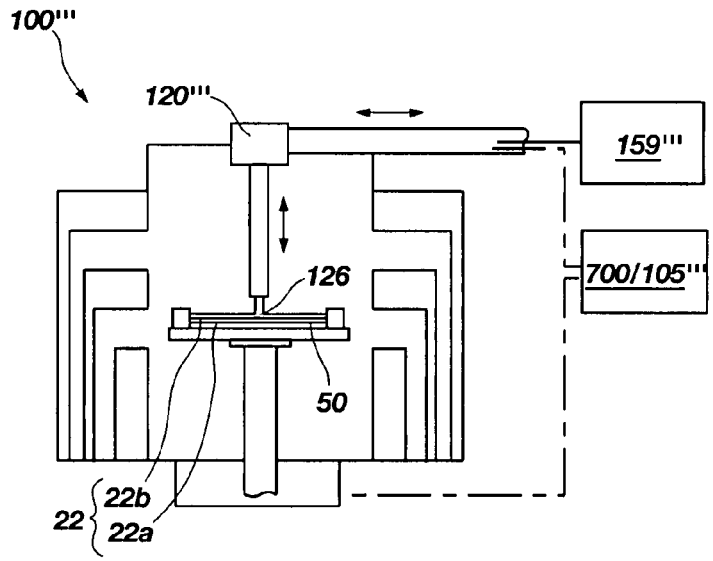
FIG. 5
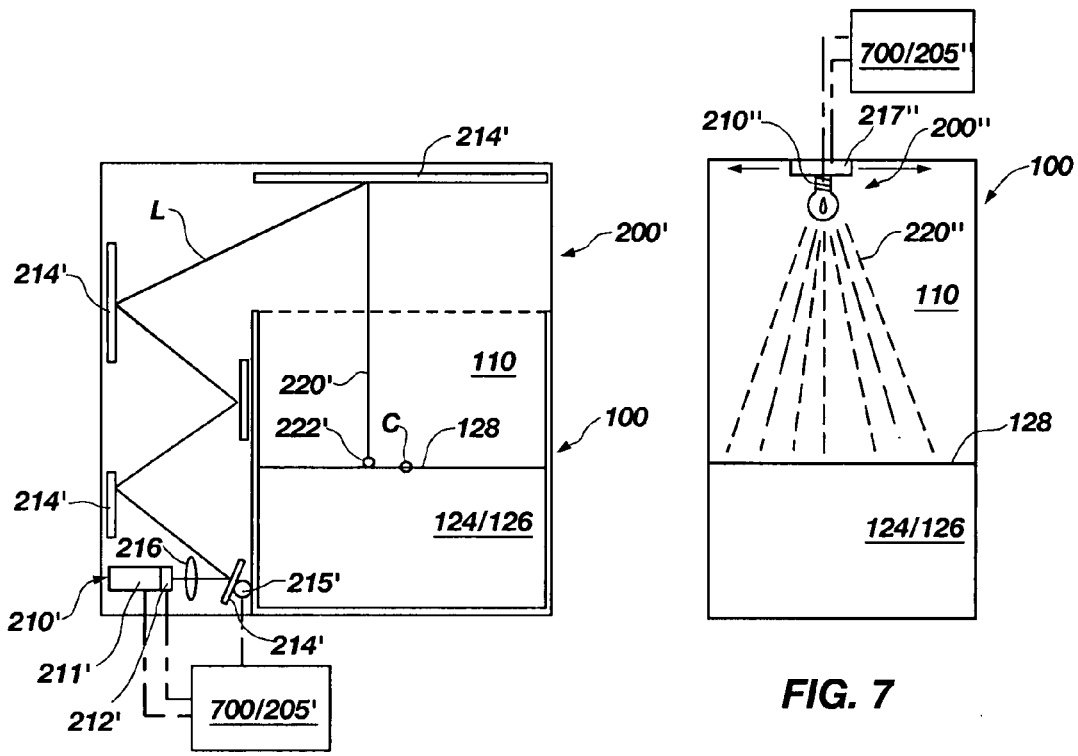
FIG. 6
FIG. 7

METHODS AND APPARATUS FOR CALIBRATING PROGRAMMABLE MATERIAL CONSOLIDATION APPARATUS

CROSS-REFERENCE TO RELATED APPLICATION

This application claims the benefit of U.S. Provisional Application No. 60/425,567, filed Nov. 11, 2002, the disclosure of which is hereby incorporated in its entirety by this reference. This application is also related to U.S. application Ser. No. 10/705,249, filed Nov. 10, 2003, pending, to U.S. application Ser. No. 10/705,250, filed Nov. 10, 2003, pending, to U.S. application Ser. No. 10/705,405, filed Nov. 10, 2003, pending, to U.S. application Ser. No. 10/705,409, filed Nov. 10, 2003, pending, to U.S. application Ser. No. 10/705,726, filed Nov. 10, 2003, pending, to U.S. application Ser. No. 10/705,728, filed Nov. 10, 2003, pending, to U.S. application Ser. No. 10/705,729, filed Nov. 10, 2003, pending, and to U.S. application Ser. No. 10/705,730, filed Nov. 10, 2003, pending.

BACKGROUND OF THE INVENTION

1. Field of the Invention

The present invention relates generally to apparatus for effecting programmed material consolidation techniques, such as stereolithography, and, more particularly, to apparatus that are configured to fabricate features on semiconductor devices and related components. The present invention also relates to programmed material consolidation methods that include use of such apparatus.

2. Background of Related Art

Over the past decade or so, a manufacturing technique which has become known as "stereolithography" and which is also known as "layered manufacturing" has evolved to a degree where it is employed in many industries.

Basically, stereolithography, as conventionally practiced, involves utilizing a computer, typically under control of three-dimensional (3-D) computer-aided design (CAD) software, to generate a 3-D mathematical simulation or model of an object to be fabricated. The computer mathematically separates or "slices" the simulation or model into a large number of relatively thin, parallel, usually vertically superimposed layers. Each layer has defined boundaries and other features that correspond to a substantially planar section of the simulation or model and, thus, of the actual object to be fabricated. A complete assembly or stack of all of the layers defines the entire simulation or model. A simulation or model which has been manipulated in this manner is typically stored and, thus, embodied as a CAD computer file. The simulation or model is then employed to fabricate an actual, physical object by building the object, layer by superimposed layer. Surface resolution of the fabricated object is, in part, dependent upon the thickness of the layers.

A wide variety of approaches to stereolithography by different companies has resulted in techniques for fabricating objects from various types of materials. Regardless of the material employed to fabricate an object, stereolithographic techniques usually involve disposition of a layer of unconsolidated or unfixed material corresponding to each layer of the simulation or model. Next, the material of a layer is selectively consolidated or fixed to at least a partially consolidated, partially fixed, or semisolid state in those areas of a given layer that correspond to solid areas of the corresponding section of the simulation or model. Also, while the material of a layer is being consolidated or fixed, that layer may be bonded to a lower layer of the object which is being fabricated.

The unconsolidated material employed to build an object may be supplied in particulate or liquid form. The material may itself be consolidated or fixed. Alternatively, when the unconsolidated material comprises particles, a separate binder material mixed therein or coating the particles may facilitate bonding of the particles to one another, as well as to the particles of a previously formed layer.

Surface resolution of the features of a fabricated object depends, at least in part, upon the material being used. For example, when particulate materials are employed, resolution of object surfaces is highly dependent upon particle size, whereas when a liquid is employed, surface resolution is highly dependent upon the minimum surface area of the liquid which can be consolidated or fixed and the minimum thickness of a material layer that can be generated. Of course, in either case, resolution and accuracy of the features of an object being produced from the simulation or model are also dependent upon the ability of the apparatus used to consolidate or fix the material to precisely track the mathematical instructions indicating solid areas and boundaries for each layer of material.

Toward that end, and depending upon the type and form of material to be fixed, stereolithographic fabrication processes have employed various fixation approaches. For example, particles have been selectively consolidated by particle bombardment (e.g., with electron beams), disposition of a binder or other fixative in a manner similar to ink-jet printing techniques, and focused irradiation using heat or specific wavelength ranges. In some instances, thin, preformed sheets of material may be superimposed to build an object, each sheet being fixed to a next-lower sheet and unwanted portions of each sheet removed, a stack of such sheets defining the completed object.

Early on in its development, stereolithography was used to rapidly fabricate prototypes of objects from CAD files. Prototypes of objects might be built to verify the accuracy of the CAD file defining the object (e.g., an object or negative of a mold to be machined) and to detect any design deficiencies and possible fabrication problems before a design was committed to large-scale production. Stereolithographic techniques have also been used in the fabrication of molds. Using stereolithographic techniques, either male or female forms on which mold material might be disposed could be rapidly generated.

In more recent years, stereolithography has been employed to develop and refine object designs in relatively inexpensive materials. Stereolithography has also been used to fabricate small quantities of objects for which the cost of conventional fabrication techniques is prohibitive, such as in the case of plastic objects that have conventionally been formed by injection molding techniques. It is also known to employ stereolithography in the custom fabrication of products generally built in small quantities or where a product design is rendered only once. Finally, it has been appreciated in some industries that stereolithography provides a capability to fabricate products, such as those including closed interior chambers or convoluted passageways, which cannot be fabricated satisfactorily using conventional manufacturing techniques. It has also been recognized in some industries that a stereolithographic object or component may be formed or built around another, pre-existing object or component to create a larger product.

Conventionally, stereolithographic apparatus have been used to fabricate freestanding structures. Such structures have been formed directly on a platen or other support system of the stereolithographic fabrication apparatus, which is located within the fabrication tank of the stereolithographic apparatus. As the freestanding structures are fabricated directly on the support system, there is typically no need to precisely and accurately position features of the stereolithographically fabricated structure. As such, conventional stereolithographic apparatus lack machine vision systems for ensuring that structures are fabricated at certain locations.

Moreover, conventional stereolithographic apparatus lack support systems, handling systems, and cleaning equipment which are suitable for use with relatively delicate structures, such as semiconductor substrates and semiconductor devices that have been fabricated thereon.

Accordingly, there is a need for stereolithography apparatus which are configured to form structures on fabrication substrates, such as semiconductor substrates and semiconductor device components and which include systems for accurately positioning the fabricated structures, supporting and handling the fabrication substrates, and cleaning excess and residual material from the fabrication substrates.

SUMMARY OF THE INVENTION

The present invention includes stereolithography apparatus and other programmable material consolidation apparatus and systems that are configured to fabricate features on semiconductor devices or on components that are configured for use with semiconductor devices. In addition, the present invention includes stereolithographic and other programmed material consolidation methods (e.g., stereolithography, layered object manufacturing (LOM), selective laser sintering (SLS), photopolymer jetting, selective particle atomization and consolidation (laser engineered net shaping, or "LENS"), and other so-called "rapid prototyping" technologies) that include use of apparatus according to the present invention. As used herein, the term "stereolithography" and variations thereof, where applicable, are intended to denote all types of programmed material consolidation techniques and is used synonymously with the phrase "programmed material consolidation" and variations thereof.

A programmed material consolidation apparatus, or "stereolithography apparatus" for simplicity, according to the present invention includes a fabrication tank, which is also referred to herein as a "fabrication chamber" or even more broadly as a "fabrication site." The fabrication tank includes a platen or other support system suitable for carrying substrates upon which structures are to be stereolithographically fabricated, which may also be termed "fabrication substrates." By way of example only, the fabrication tank and the support therein may be sized and configured to receive one or more semiconductor substrates, each of which carries a plurality of semiconductor devices. Alternatively, or in addition, the platen or other support system may be configured to support freestanding structures as they are fabricated. In addition, the fabrication tank may include a reservoir that is configured to hold a volume of unconsolidated material, such as a liquid polymer.

A material consolidation system is associated with the fabrication tank in such a way as to direct consolidating energy (e.g., in the form of radiation, such as a laser beam or less-focused radiation) to a surface of the quantity of unconsolidated material within the reservoir of the fabrication tank. When selective consolidation is desired, a high level of precision may be achieved when the consolidating energy is focused and the surface of the quantity of unconsolidated material and the focal point for the consolidating energy substantially intersect one another.

Optionally, a stereolithography apparatus that incorporates teachings of the present invention may include a machine vision system. The machine vision system includes an optical detection element, such as a camera, as well as a controller or processing element, such as a computer processor or a collection of computer processors, associated with the optical detection element. The optical detection element may be positioned in a fixed location relative to the fabrication tank or configured to move relative to the fabrication tank.

When included as part of a stereolithographic apparatus that incorporates teachings of the present invention, the optical detection element of a machine vision system is useful for identifying the locations of recognizable features, including, without limitation, features on a fabrication substrate and features, such as fiducial marks, at a fabrication site. For example, the optical detection element may be configured and/or located to "see" relatively large structures, such as those that can be seen by the naked eye (i.e., macroscopic structures), such as the locations of semiconductor devices upon a fabrication substrate. Alternatively, or in addition, the optical detection element may be configured and/or located to "see" very small, even microscopic structures.

Another optional feature of a stereolithographic apparatus of the present invention is a cleaning component. A cleaning component may be positioned and configured to remove excess liquid polymer from a fabrication substrate while the fabrication substrate remains positioned upon a support system that is associated with the fabrication tank. Such a cleaning component may comprise at least a part of the fabrication tank and, thus, operate prior to introduction of another fabrication substrate into the fabrication tank. Alternatively, excess liquid polymer may be removed from a fabrication substrate during or following removal thereof from the fabrication tank.

Additionally, a stereolithographic apparatus that incorporates teachings of the present invention may include a material reclamation system. The material reclamation system may be associated with one or both of the fabrication tank and a cleaning component, if the stereolithographic apparatus includes a cleaning component. By way of example, the material reclamation system may collect material from the cleaning component and recycle the same into the fabrication tank.

A programmed material consolidation system that incorporates teachings of the present invention may include a plurality of fabrication sites and share a common material consolidation system, machine vision system, handling system, cleaning component, or material reclamation system.

The present invention also includes methods for calibrating stereolithographic apparatus that incorporate teachings of the present invention. For example, the locations at which unconsolidated material may be selectively consolidated may be calibrated with a machine vision system. As another example, the magnification of a machine vision system may be calibrated. Also, a material consolidation system of a stereolithographic apparatus according to the present invention may be calibrated to optimize the linearity with which selectively consolidating energy impinges on a surface of unconsolidated material.

Programmed material consolidation fabrication processes, including methods of using each of the features described herein, are also within the scope of the present invention. In particular, stereolithographic fabrication processes that incorporate teachings of the present invention include the use of stereolithographic techniques to fabricate features on another structure, or fabrication substrate, such as a semiconductor substrate or semiconductor device component (e.g., a lead frame, a circuit board, etc.).

Other features and advantages of the present invention will become apparent to those of skill in the art through consideration of the ensuing description, the accompanying drawings, and the appended claims.

BRIEF DESCRIPTION OF THE DRAWINGS

In the drawings, which depict exemplary embodiments of various features of the present invention:

FIG. 2 schematically depicts an exemplary stereolithographic apparatus in which a single material consolidation system and/or a single machine vision system may be shared by a plurality of fabrication tanks;

FIG. 3 schematically depicts an exemplary embodiment of fabrication tank that may be used in a stereolithographic apparatus of the present invention, the fabrication tank including a cavity and a reservoir which are continuous with one another;

FIG. 3A illustrates an exemplary support element of the fabrication tank of FIG. 3, which support element has a substantially planar support surface;

FIG. 3B shows another exemplary support element of the fabrication tank shown in FIG. 3, which support element includes recesses formed in the support surface thereof;

FIG. 4 schematically depicts another embodiment of fabrication tank that includes a rotatable support element and which may be used in a stereolithographic apparatus according to the present invention, such as those shown in FIGS. 1 and 2, which fabrication tank also comprises a cleaning component and a material reclamation system;

FIG. 4A is a top view of an example of a retention system for use with a support system of the fabrication tank of FIG. 4;

FIG. 4B is a cross-section taken along line 4B—4B of FIG. 4A;

FIG. 4D is a cross-section taken along line 4D—4D of FIG. 4C;

FIG. 4E is a cross-sectional representation of another embodiment of support system that may be used in a fabrication tank of a semiconductor fabrication apparatus according to the present invention;

FIG. 5 is a schematic representation of still another exemplary embodiment of fabrication tank that incorporates teachings of the present invention;

FIG. 6 is a schematic representation of an exemplary embodiment of a material consolidation system according to the present invention, which is configured to focus consolidating energy so as to selectively consolidate unconsolidated material which has been placed over a fabrication substrate;

FIG. 7 schematically depicts another exemplary embodiment of material consolidation system, which is configured to generally consolidate unconsolidated material which has been placed over a fabrication substrate;

DETAILED DESCRIPTION

Figure 1:
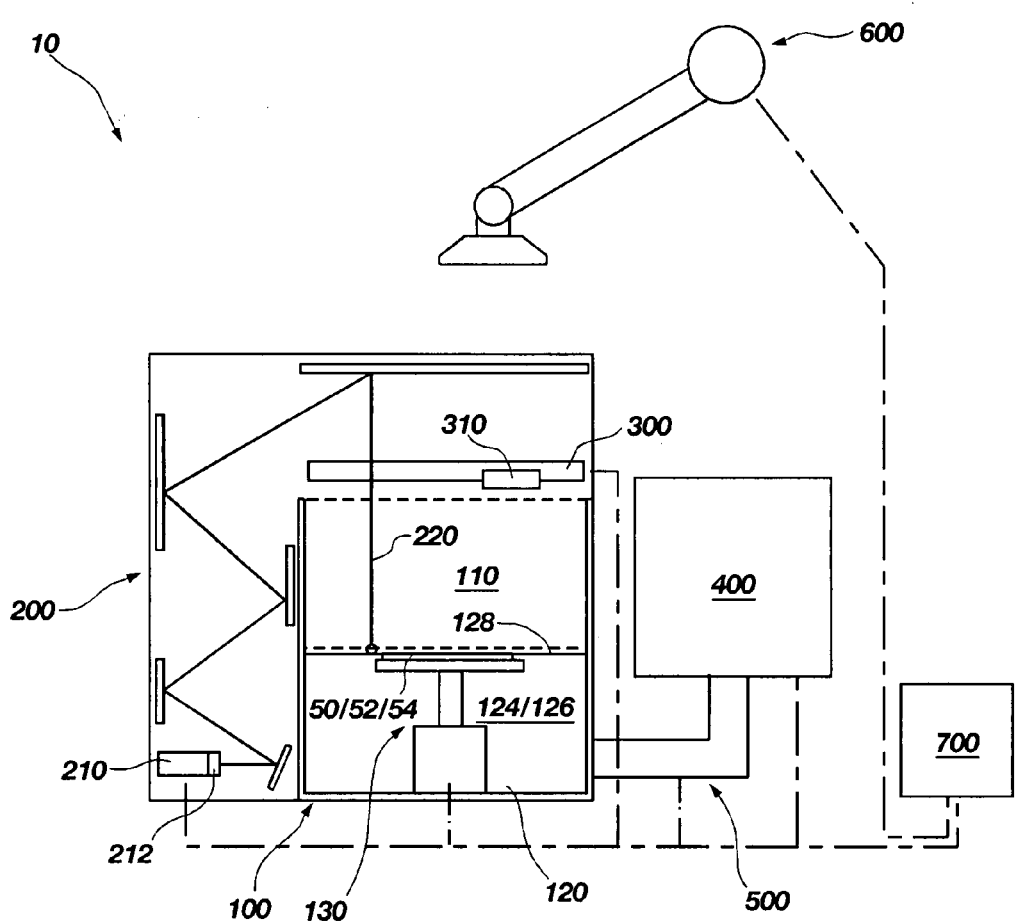
FIG. 1 is a schematic representation of various possible elements of a stereolithographic apparatus for fabricating features on semiconductor devices or associated components in accordance with the present invention, the elements including a fabrication tank, a material consolidation system, a machine vision system, a cleaning component, and a material reclamation system.

An exemplary stereolithography apparatus 10 for fabricating features on semiconductor substrates 52, semiconductor devices 54 or associated components (e.g., lead frames, circuit boards, etc.) (not shown) or other fabrication substrates 50 is schematically depicted in FIG. 1. As shown, stereolithography apparatus 10 includes a fabrication tank 100 and a material consolidation system 200, a machine vision system 300, a cleaning component 400, and a material reclamation system 500 that are associated with fabrication tank 100. The depicted stereolithography apparatus 10 also includes a substrate handling system 600, such as a rotary feed system or linear feed system available from Genmark Automation Inc., of Sunnyvale, Calif., for moving fabrication substrates 50 from one system of stereolithography apparatus to another. Features of one or more of the foregoing systems may be associated with one or more controllers 700, or processing elements, such as computer processors or smaller groups of logic circuits, in such a way as to effect their operation in a desired manner.

Controller 700 may comprise a computer or a computer processor, such as a so-called "microprocessor," which may be programmed to effect a number of different functions. Alternatively, controller 700 may be programmed to effect a specific set of related functions or even a single function. Each controller 700 of stereolithography apparatus 10 may be associated with a single system thereof or a plurality of systems so as to orchestrate the operation of such systems relative to one another.

Fabrication tank 100 includes a chamber 110 which is configured to contain a support system 130. In turn, support system 130 is configured to carry one or more fabrication substrates 50. By way of example only, the types of fabrication substrates 50 that support system 130 may be configured to carry may include, without limitation, a bulk semiconductor substrate 52 (e.g., a full or partial wafer of semiconductive material, such as silicon, gallium arsenide, indium phosphide, a silicon-on-insulator (SOI) type substrate, such as silicon-on-ceramic (SOC), silicon-on-glass (SOG), or silicon-on-sapphire (SOS), etc.) that includes a plurality of semiconductor devices 54 thereon.

Fabrication tank 100 may also have a reservoir 120 associated therewith. Reservoir 120 may be continuous with chamber 110. Alternatively, reservoir 120 may be separate from, but communicate with, chamber 110 in such a way as to provide unconsolidated material 126 thereto. Reservoir 120 is configured to at least partially contain a volume 124 of unconsolidated material 126, such as a photoimageable polymer, or "photopolymer," particles of thermoplastic polymer, resin-coated particles, or the like.

Photopolymers believed to be suitable for use with a stereolithography apparatus 10 according to the present invention include, without limitation, ACCURA® SI 40 Hc and AR materials, ACCURA® SI 40 ND material, and CIBATOOL SL 5170, SL 5210, SL 5530, and SL 7510 resins. The ACCURA® materials are available from 3D Systems, Inc., of Valencia, Calif., while the CIBATOOL resins are available from Ciba Specialty Chemicals Inc., of Bezel, Switzerland.

Reservoir 120 or another component associated with one or both of fabrication tank 100 and reservoir 120 thereof may be configured to maintain a surface 128 of a portion of volume 124 located within chamber 110 at a substantially constant elevation relative to chamber 110.

A material consolidation system 200 is associated with fabrication tank 100 in such a way as to direct consolidating energy 220 into chamber 110 thereof, toward at least areas of surface 128 of volume 124 of unconsolidated material 126 within reservoir 120 that are located over fabrication substrate 50. Consolidating energy 200 may comprise, for example, electromagnetic radiation of a selected wavelength or a range of wavelengths, an electron beam, or other suitable energy for consolidating unconsolidated material 126. Material consolidation system 200 includes a source 210 of consolidating energy 220. If consolidating energy 220 is focused, source 210 or a location control element 212 associated therewith (e.g., a set of galvanometers, including one for x-axis movement and another for y-axis movement) may be configured to direct, or position, consolidating energy 220 toward a plurality of desired areas of surface 128. Alternatively, if consolidating energy 220 remains relatively unfocused, it may be directed generally toward surface 128 from a single, fixed location or from a plurality of different locations. In any event, operation of source 210, as well as movement thereof, if any, may be effected under the direction of controller 700.

When material consolidation system 200 directs focused consolidating energy 220 toward surface 128 of volume 124 of unconsolidated material 126, stereolithography apparatus 10 may also include a machine vision system 300. Machine vision system 300 facilitates the direction of focused consolidating energy 220 toward desired locations of features on fabrication substrate 50. As with material consolidation system 200, operation of machine vision system 300 may be proscribed by controller 700. If any portion of machine vision system 300, such as a camera 310 thereof, moves relative to chamber 110 of fabrication tank 100, that portion of machine vision system 300 may be positioned so as provide a clear path to all of the locations of surface 128 that are located over each fabrication substrate 50 within chamber 110.

Optionally, as schematically depicted in FIG. 2, one or both of material consolidation system 200 (which may include a plurality of mirrors 214) and machine vision system 300 of a stereolithography apparatus 10' may be oriented and configured to operate in association with a plurality of fabrication tanks 100. Of course, one or more controllers 700 would be useful for orchestrating the operation of material consolidation system 200, machine vision system 300, and substrate handling system 600 relative to a plurality of fabrication tanks 100.

With returned reference to FIG. 1, cleaning component 400 of stereolithography apparatus 10 may also operate under the direction of controller 700. Cleaning component 400 of stereolithography apparatus 10 may be continuous with a chamber 110 of fabrication tank 100 or positioned adjacent to fabrication tank 100. If cleaning component 400 is continuous with chamber 110, any unconsolidated material 126 that remains on a fabrication substrate 50 may be removed therefrom prior to introduction of another fabrication substrate 50 into chamber 110.

If cleaning component 400 is positioned adjacent to fabrication tank 100, residual unconsolidated material 126 may be removed from a fabrication substrate 50 as fabrication substrate 50 is removed from chamber 110. Alternatively, any unconsolidated material 126 remaining on fabrication substrate 50 may be removed therefrom after fabrication substrate 50 has been removed from chamber 110, in which case the cleaning process may occur as another fabrication substrate 50 is positioned within chamber 110.

Material reclamation system 500 collects excess unconsolidated material 126 that has been removed from a fabrication substrate 50 by cleaning component 400, then returns the excess unconsolidated material 126 to reservoir 120 associated with fabrication tank 100.

Fabrication Sites

Figure 3C:
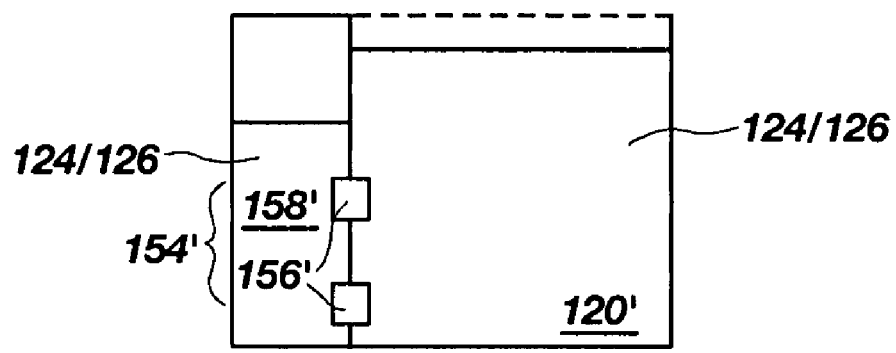
FIG. 3C illustrates an exemplary volume control element of the fabrication tank depicted in FIG. 3, which volume control element is configured to add unconsolidated material to and/or remove unconsolidated material from the reservoir of the fabrication tank.
Figure 3D:
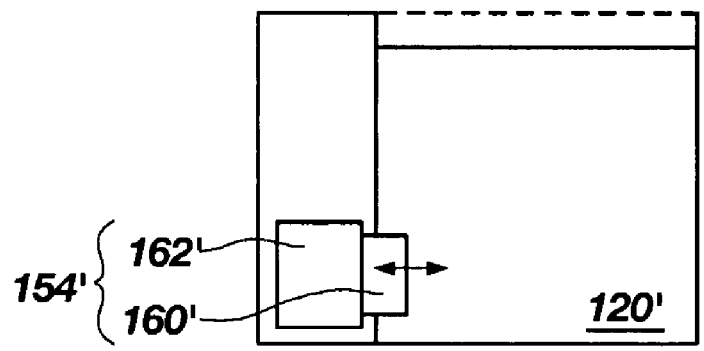
FIG. 3D depicts another exemplary volume control element of the fabrication tank of FIG. 3, which volume control element is configured to displace unconsolidated material located within the reservoir of the fabrication tank.
Figure 3E:
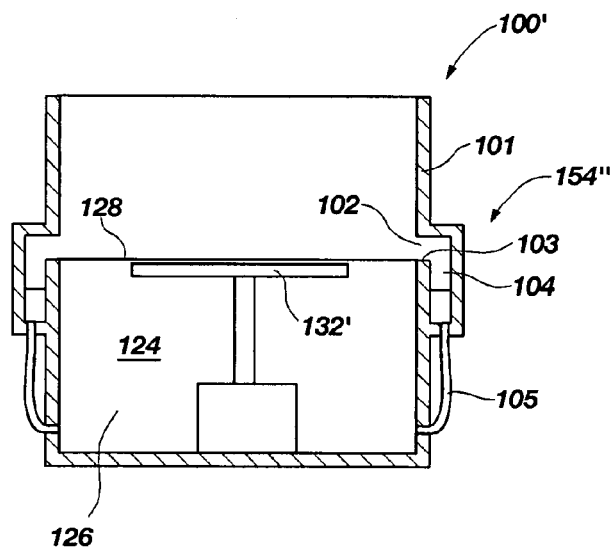
FIG. 3E schematically depicts a stereolithographic fabrication tank which includes another variation of volume control and surface level control element.
Figure 4C:
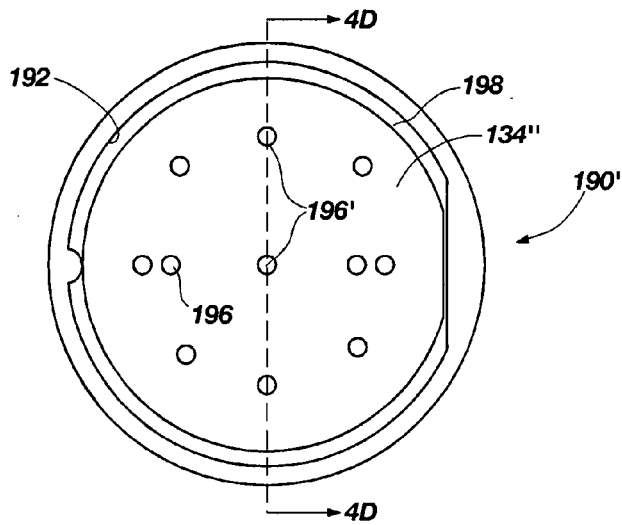
FIG. 4C is a top view of another example of a retention system for use with a support system of the fabrication tank of FIG. 4.
Figure 4F:
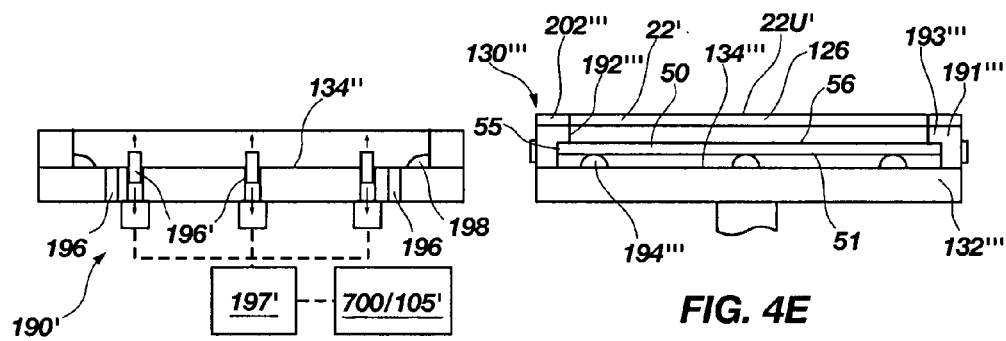
FIG. 4F is a top view of the support system shown in FIG. 4E.
Figure 4F:
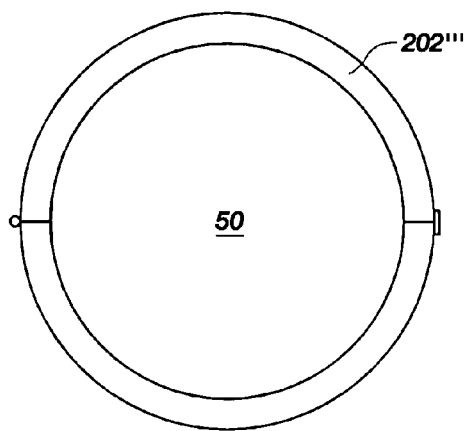

Turning now to FIGS. 3–5, various exemplary embodiments of fabrication sites, chambers, or tanks, that may be used in a stereolithography apparatus 10 (FIG. 1) or other programmable material consolidation apparatus or system that incorporates teachings of the present invention are illustrated.

FIG. 3 shows a fabrication tank 100' which includes a chamber 110' that is continuous with a reservoir 120'. A support system 130', which includes a platen, or support element 132', a positioning element 140', and an actuation element 146', is located within reservoir 120', beneath chamber 110', and may be moved to a plurality of different vertical positions, or elevations, therein.

A substrate-supporting surface of support element 132', which is also referred to herein as a support surface 134' for the sake of simplicity, may be substantially planar, as shown in FIG. 3A. Alternatively, as depicted in FIG. 3B, support surface 134' may have one or more recesses 136' formed therein, each recess 136' being configured to receive at least a portion of a fabrication substrate 50. Additionally, each recess 136' may be configured to position a fabrication substrate 50 in a desired orientation upon introduction of the same thereinto. Support surface 134' may be configured to carry a single fabrication substrate 50 or a plurality of fabrication substrates 50.

Positioning element 140' may be coupled to a bottom surface 138' of support element 132' or otherwise operatively associated with support element 132'. Positioning element 140' is depicted as being an elongate structure that includes a coupling end 142' that has been secured to bottom surface 138', as well as an opposite, actuation end 144'. Nonetheless, positioning elements 140' of other configurations are also within the scope of the present invention. By way of example only, positioning element 140' may comprise a hydraulically or pneumatically actuated piston, a screw, a linear actuator or stepper element, a series of gears, or the like.

Actuation element 146' is, of course, associated with and configured to effect movement of positioning element 140'. Accordingly, examples of actuation elements 146' that may be used as part of support system 130' include, but are not limited to, hydraulic actuators, pneumatic actuators, screw-drive motors, stepper motors, and other known actuation means for controlling the movement of positioning element 140' in such a way as to cause support element 132' to move from one elevation to another in a substantially vertical direction and with a higher degree of dimensional precision. Additionally, positioning element 140' and actuation element 146' may desirably elevate support element 132' and, thus, each fabrication substrate 50 thereon out of chamber 110' to facilitate movement of each fabrication substrate 50 by substrate handling system 600 (FIGS. 1 and 2). Alternatively, the level at which surface 128 of volume 124 of unconsolidated material 126 is located may be lowered below support surface 134'.

Control over the operation of actuation element 146' and, thus, over the movement of positioning element 140' and elevation of support element 132' may be provided by controller 700 or another processing element 105' (e.g., a processor or smaller collection of logic circuits), which may be dedicated for use with support system 130' or fabrication tank 100', in communication therewith, either as a part of fabrication tank 100' or, more generally, as a part of stereolithography apparatus 10, 10' (FIGS. 1 and 2).

Reservoir 120' may include a surface level control element 150' which is configured to maintain surface 128 of volume 124 of unconsolidated material 126 at a substantially constant elevation. Surface level control element 150' may include a surface level sensor 152' and an element for adjusting volume 124 of unconsolidated material 126, which element is referred to herein as a "volume adjustment element" 154'. Both surface level sensor 152' and volume adjustment element 154' may communicate with controller 700 or processing element 105', which monitors the level of surface 128, as indicated by signals produced and transmitted by surface level sensor 152', and facilitates adjustment or displacement of volume 124 by way of volume adjustment element 154' to compensate for changes in the elevation of surface 128 and thereby maintain surface 128 at a substantially constant elevation.

By way of example only, surface level sensor 152' may comprise a laser sensor and reflected laser beam, which may be used in connection with one or more charge-coupled device (CCD) cameras or complementary metal-oxide-semiconductor (CMOS) cameras. Triangulation techniques may be used with such devices to determine the distance of surface 128 from a fixed point and, thus, the elevation, or level, at which surface 128 is located.

If volume adjustment element 154' is configured to change volume 124 of unconsolidated material 126 within reservoir 120', volume adjustment element 154' may comprise a pump 156' or series of pumps 156' that may remove unconsolidated material 126 from reservoir 120' and transport the same to an external reservoir 158', as well as add unconsolidated material 126 from an external reservoir 158' to reservoir 120', as shown in FIG. 3C.

If volume adjustment element 154' is instead configured to displace a portion of volume 124 located within reservoir 120', volume adjustment element 154' may, for example, comprise a piston or other displacement member 160' which may be incrementally introduced into and withdrawn from reservoir 120', as shown in FIG. 3D. Of course, movement of such a displacement member 160' may be effected by an actuator 162' therefor, such as a hydraulic actuator, a pneumatic actuator, a screw-drive motor, a stepper motor, or the like. Alternatively, vibrations may be transmitted directly to unconsolidated material 126 by, for example, a piston face, diaphragm, or the like.

Alternatively, as shown in FIG. 3E, a volume adjustment element 154" may include one or more apertures or other openings 102 in a side wall 101 of fabrication tank 100' that have lower edges 103 that are positioned at an elevation within fabrication tank 100' at which surface 128 of volume 124 of unconsolidated material 126 is to be maintained. In addition, surface level control element 154" includes one or more receptacles 104 that communicate with openings 102 to receive overflowing unconsolidated material 126 as support element 132' and a substrate or other workpiece thereon, as well as any stereolithographically fabricated objects, are lowered into fabrication tank 100' and displace unconsolidated material 126 therein. A pumping system or other material recycling element 105 may communicate with each receptacle 104 in such a way as to return overflowed unconsolidated material 126 to tank 100' as support element 132' is raised to facilitate stereolithographic fabrication of one or more other objects.

The introduction of support element 132' or one or more fabrication substrates 50 into a volume 124 of unconsolidated material 126 contained within reservoir 120' may result in the introduction of gas or air bubbles into unconsolidated material 126. Accordingly, referring again to FIG. 3, fabrication tank 100' may optionally include a bubble elimination system 165' which is associated with a boundary or wall 114' of reservoir 120' or with support system 130' so as to facilitate the removal of air or gas bubbles (not shown) from unconsolidated material 126. By way of example, bubble elimination system 165' may comprise an ultrasonic transducer of a known type (e.g., a piezoelectric transducer), which causes fabrication tank 100' or support system 130' thereof to vibrate. Vibrations in fabrication tank 100' or support system 130' are transmitted to unconsolidated material 126 within reservoir 120', causing any bubbles therein to dislodge from a structure to which they are adhered and float to surface 128, where they will pop or may be removed, such as by use of negative pressure.

Referring now to FIG. 4, another exemplary embodiment of fabrication tank 100" is illustrated. Fabrication tank 100" includes a reservoir 120" at the base thereof and a chamber 110" which is located over reservoir 120" and which is continuous therewith. In addition, chamber 110" of fabrication tank 100" includes a material reclamation zone 170", as well as a cleaning zone 180" located above material reclamation zone 170".

Figure 14:
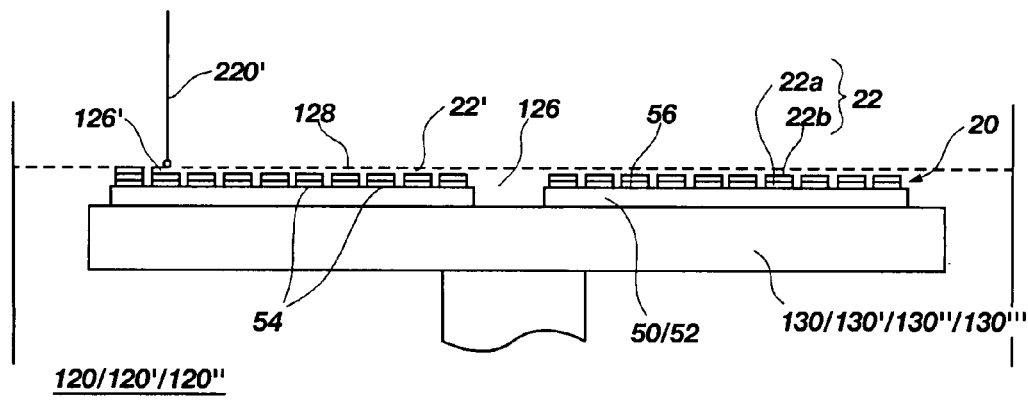
FIG. 14 is a cross-sectional representation of a fabrication substrate and an object being stereolithographically fabricated thereon in accordance with teachings of the present invention.

As shown, reservoir 120" may be configured to contain a substantially constant volume 124 of material, including unconsolidated material 126 and, if stereolithographic processes have been initiated, consolidated material 126' (FIG. 14). Accordingly, reservoir 120" may include a surface level control element 150", such as that described above in reference to FIGS. 3, 3C, and 3D.

A support system 130" of fabrication tank 100" includes a support element 132" which is positionable at a plurality of distinct, precise elevations within reservoir 120" and, optionally, within chamber 110". Movement of support element 132" is effected by a positioning element 140". Positioning element 140" is, in turn, associated with an actuation element 146", which may be actuated to cause positioning element 140" to move so as to position support element 132" at a desired elevation within reservoir 120" or chamber 110". Additionally, positioning element 140" may elevate support element 132" and, thus, any fabrication substrates 50 thereon out of chamber 110" to facilitate handling of fabrication substrates 50 by substrate handling system 600 (FIGS. 1 and 2). Actuation element 146" may communicate with controller 700 or processing element 105' in such a way that controller 700 directs the operation of actuation element 146".

In addition, actuation element 146" may be configured to rotate support element 132" about an axis A thereof and within a plane P in which support element 132" is located. Alternatively, fabrication tank 100" may include a rotation element 148" that is independent from actuation element 146" and which is configured to cause support element 132" to rotate. Such rotation may occur under instructions, in the form of signals or carrier waves, from controller 700 or processing element 105'. By way of example and not by way of limitation, a stepper motor or a screw-drive motor that has been modified to move a screw, then maintain the screw in a substantially constant location when the screw has reached one or more certain positions (e.g., material reclamation zone 170" or cleaning zone 180"), may be used as either actuation element 146" or rotation element 148".

When support element 132" is moved into material reclamation zone 170" or cleaning zone 180" of chamber 110", actuation element 146" or rotation element 148" may cause support element 132" to accelerate and rotate at a sufficient speed that centrifugal force causes any excess unconsolidated material 126 and/or cleaning agents 127, such as water, solvents for unconsolidated material 126, detergents, combinations thereof, or the like, to be removed from a fabrication substrate 50 carried thereby while remaining substantially within the same plane as that within which support element 132" is located.

Material reclamation zone 170" and cleaning zone 180" may each be provided with a receptacle 172", 182", respectively, that extends substantially around the periphery of an inner boundary or wall 114" of reservoir 120". Receptacles 172" and 182" are each positioned at approximately the same elevations within reservoir 120" that support element 132" will be located when positioned within reclamation zone 170" and cleaning zone 180" thereof, respectively. Accordingly, as excess unconsolidated material 126 and/or cleaning agents 127 are removed, by spinning, from each fabrication substrate 50 that is carried by support element 132", receptacle 172", 182" will receive substantially all of the excess unconsolidated material 126 or cleaning agents 127 that are removed therefrom.

Since support element 132" of fabrication tank 100" is configured to be rotated, or spun, at relatively high speed, support element 132" may be configured to retain one or more fabrication substrates 50 during such rotation, or spinning. FIGS. 4A and 4B depict an example of a retention system 190 that may be used on a support element 132" to secure a fabrication substrate 50 in place thereon, particularly when support element 132" is being accelerated to spin at high rotational speeds.

The depicted retention system 190 includes a raised periphery 191 that forms a receptacle 192 within which a fabrication substrate 50 may be substantially laterally contained. Thus, when support element 132" is rotated, or spun, raised periphery 191 prevents a fabrication substrate 50 that is being carried by support element 132" from being thrown laterally therefrom. One or more alignment features 193, which ensure that fabrication substrate 50 has been properly positioned and oriented within receptacle 192, may also be formed by the inner border of raised periphery 191. In addition, retention system 190 may include one or more access elements 194 which provide access to portions of an outer periphery 55 of a fabrication substrate 50 located within receptacle 192, thereby facilitating removal of fabrication substrate 50 from receptacle 192, as well as placement of another fabrication substrate 50 therein.

Optionally, raised periphery 191 may protrude above an upper surface 56 of fabrication substrate 50 a distance which comprises a maximum distance a stereolithographically fabricated object (not shown) may protrude from upper surface 56. Unconsolidated material 126 that is introduced onto upper surface 56 of fabrication substrate 50 may be laterally contained by raised periphery 191. An upper surface 22U' of the uppermost layer 22' of unconsolidated material 126 within the confines of raised periphery 191 may be planarized by translating a planarizing element 195, such as a meniscus blade (which includes a meniscus at the trailing edge thereof) or air knife, thereacross to remove unconsolidated material 126 and/or smooth upper surface 22U'. An uppermost surface of raised periphery 191 defines the level at which planarizing element 195 may be translated across unconsolidated material 126.

Raised periphery 191 may be an integral part of a support surface 134" of support element 132", with the majority of retention system 190 being formed in support surface 134". Alternatively, retention system 190 may be formed separately from the manufacture of support element 132" and secured to support surface 134" thereof. By way of example only, stereolithographic processes may be employed to fabricate retention system 190 on support surface 134", such as by using stereolithography apparatus 10.

Additionally, retention system 190 may include a sealing element 198, which may be positioned on support surface 134" so as to underlie at least a periphery of a fabrication substrate 50 positioned thereover. By way of example only, sealing element 198 may comprise a somewhat flattened ring which is configured to seal against an outer periphery 55 of fabrication substrate 50, as well as regions of bottom surface 51 of fabrication substrate 50 which are located adjacent to outer periphery 55. Such a sealing element 198 may prevent unconsolidated material 126 from contacting bottom surface 51 of fabrication substrate 50 and support surface 134" of support element 132". Exemplary materials from which sealing element 198 may be fabricated include, without limitation, compressible, resilient materials, such as silicone, polyurethane, ethylene vinyl alcohol (EVA), or the like.

Also, in order to secure fabrication substrate 50 in place relative to support surface 134", retention system 190 may include one or more pressure ports 196, which are configured to communicate with a pressure source 197 (e.g., a vacuum or an air compressor). As support element 132" is configured to be rotated, each pressure port 196 may be fitted with a valve 199, which seals that pressure port 196 when pressure source 197 is not in communication therewith. Of course, such valves 199 are not necessary when support element 132" does not rotate, as in fabrication tank 100'. As a negative pressure is applied through the one or more pressure ports 196 to a bottom surface 51 of fabrication substrate 50, the negative pressure pulls fabrication substrate 50 against sealing element 198, sealing bottom surface 51 against sealing element 198. In addition to securing fabrication substrate 50 over support surface 134" and possibly providing a cushion for fabrication substrate 50, as noted previously, sealing element 198 may prevent unconsolidated material 126 from contacting bottom surface 51 and support surface 134". Operation of pressure source 197 and, if necessary, communication thereof with pressure ports 196 may be under control of controller 700, processing element 105', or another processing element that is dedicated for use with retention system 190.

FIGS. 4C and 4D illustrate a variation of retention system 190', which is useful with support element 132" of fabrication tank 100". Retention system 190' includes one or more ejection elements 196'. Ejection elements 196' are useful for removing fabrication substrate 50 from receptacle 192, as well as for breaking a seal caused by the presence of a negative pressure beneath fabrication substrate 50, which is applied against at least a portion of bottom surface 51 thereof. Operation of ejection elements 196' may be controlled by way of a controller 700 in communication therewith. By way of example only, each ejection element 196' may comprise a mechanical piston that may be recessed within support surface 134" to facilitate placement of a fabrication substrate 50 thereon or raised by an actuation element 197' (e.g., a pneumatic, hydraulic, or mechanical actuation element) to protrude from support surface 134" and eject a fabrication substrate 50 from receptacle 192 and raise fabrication substrate 50 to facilitating grasping thereof by substrate handling system 600. In this example, it is actuation element 197' that communicates with controller 700, processing element 105', or another processing element and that operates in accordance with instructive signals, or carrier waves, from controller 700, processing element 105', or the other processing element.

Alternatively, referring again to FIGS. 4A and 4B, each ejection element 196' may comprise a pressure port 196, which, as described previously herein, communicates with one or more pressure sources 197. A negative air pressure may be applied through pressure port 196 to a bottom surface 51 of a fabrication substrate 50 to secure the same to support surface 134". Conversely, a positive air pressure may be forced through port 196 against bottom surface 51 to eject a fabrication substrate 50 from support surface 134". As shown, each pressure source 197 may communicate with controller 700, processing element 105', or another processing element (FIG. 4), which directs operation of pressure source 197 by known means. The use of ejection element 196' to apply positive air pressure to bottom surface 51 of fabrication substrate 50 may also be used to break a seal, if any, between bottom surface 51 and a feature, such as a sealing element 198, of support element 132".

Optionally, pressure ports 196 may be configured and the output of pressure source 197 modulated so as to create a circulating airflow beneath bottom surface 51 as positive pressure is forced therethrough, causing fabrication substrate 50 to be lifted off of support surface 134" in such a way as to hover thereover in accordance with Bernoulli's Law. Such an ejection element 196' is, therefore, useful for facilitating the grasping of fabrication substrate 50 by a substrate handling system 600 (FIGS. 1 and 2) of stereolithography apparatus 10, 10', as well as to remove any unconsolidated material 126 from support surface 134".

Another embodiment of support system 130''' that may be used in a fabrication tank 100, 100', 100" of a stereolithography apparatus 10, 10' according to the present invention is shown in FIGS. 4E and 4F. Support system 130''' includes a support element 132''' and a locking ring 191''' that surrounds at least a portion of outer periphery 55 of fabrication substrate 50 to secure the same to support element 132'''. Locking ring 191''' forms a receptacle 192''' within which fabrication substrate 50 is laterally contained. An upper surface 56 of fabrication substrate 50, however, remains substantially exposed.

Locking ring 191''' includes an upper, laterally inwardly extending lip 193''' which is configured to contact an upper surface 56 of fabrication substrate 50. As locking ring 191''' also defines a fixed distance between a support surface 134''' and lip 193''', which distance may not be the same as the thickness of a fabrication substrate 50 to be positioned therebetween, one or more spacers 194''' may be fabricated (e.g., stereolithographically) or positioned on support surface 134''' so that support system 130''' may be tailored to accommodate thinner fabrication substrates 50. Spacers 194''' are also useful for preventing bottom surface 51 of fabrication substrate 50 from adhering to support surface 134''' of support element 132'''. Support elements 132''' of this type, including stereolithographically fabricated support elements 132''', may be reused.

A thickness of lip 193''' may define a maximum distance a stereolithographically fabricated object (not shown) may protrude from upper surface 56 of fabrication substrate 50. The thickness of lip 193''' may be increased by positioning or forming (e.g., stereolithographically) an extension ring 202''' thereon. Unconsolidated material 126 that is introduced onto upper surface 56 of fabrication substrate 50 may be laterally contained by lip 193'''. By way of example only, unconsolidated material 126 may be introduced within the confines of lip 193''' and any extension rings 202''' thereon by lowering support system 130''' beneath surface 128 (FIG. 4) of volume 124 of unconsolidated material 126 so as to permit unconsolidated material 126 to flow therein, then raising support system 130''' so that an upper edge of lip 193''' or an extension ring 202''' thereon is substantially coplanar with surface 128.

An upper surface 22U' of the uppermost layer 22' of unconsolidated material 126 within the confines of lip 193''' and any extension rings 202''' thereon may be planarized by translating a planarizing element 195, such as a meniscus blade or air knife, thereacross (FIG. 4B). An uppermost surface of lip 193''' or an extension ring 202''' thereon defines the level at which planarizing element 195 may be translated across unconsolidated material 126.

Optionally, with returned reference to FIG. 4, fabrication tank 100" may include a bubble elimination system 165', such as that described in reference to FIG. 3. Alternatively, stereolithographic fabrication tanks 100, such as those that have chambers 110 with relatively small volumes (e.g., which are sufficient to contain only a single semiconductor substrate 52), may include bubble elimination systems that create a negative pressure, or vacuum, within the chambers thereof. Such a bubble elimination system may, for example, include one or more sealing elements, which substantially seal chamber 110 of stereolithography apparatus 10 (FIG. 1), chamber 110, as well as a negative pressure source that communicates at least with chamber 110 so as to facilitate the creation of a negative pressure therein.

Turning now to FIG. 5, still another embodiment of fabrication tank 100''' that may be used in a stereolithography apparatus 10, 10' (FIGS. 1 and 2) according to the present invention is shown. Fabrication tank 100''' includes substantially all of the same elements as the embodiment of fabrication tank 100'' described in reference to FIG. 4, except for reservoir 120''. Instead of an integral reservoir, such as reservoir 120'', fabrication tank 100''' includes a dispenser 120''' for applying unconsolidated material 126, which is drawn from an external reservoir 159''', to a fabrication substrate 50. By way of example only, dispenser 120''' may comprise a laminar flow dispenser or a spray nozzle of a known type. A laminar flow dispenser is currently preferred for use as material dispenser 120''', as laminar flow would result in the presence of fewer air bubbles in unconsolidated material 126 than would be present if unconsolidated material 126 were sprayed onto fabrication substrate 50 and, thus, eliminate the need for removing such bubbles. Additionally, when dispensed with a laminar flow dispenser, unconsolidated material 126 may be applied to upper surface 56 of fabrication substrate 50 without covering any structures that protrude therefrom (e.g., solder balls that protrude from a semiconductor device 54), thereby eliminating the need to subsequently remove consolidated material or unconsolidated material 126 from such structures. Dispenser 120''' may apply a predetermined quantity, or metered amount, of unconsolidated material 126 onto fabrication substrate 50 to form a single layer 22 or multiple layers 22a, 22b, etc. of unconsolidated material 126 thereon, which are to be sequentially dispensed and, possibly, sequentially consolidated.

Of course, operation of dispenser 120''' may be controlled by controller 700 or by a processing element 105''' (e.g., a processor or smaller group of logic circuits) that is associated with fabrication tank 100'''.

Material Consolidation System

Various exemplary embodiments of material consolidation systems 200 (FIGS. 1 and 2) that may be used in a stereolithography apparatus 10 according to the present invention are shown in FIGS. 6 and 7.

With reference to FIGS. 1 and 6, a stereolithography apparatus 10 that incorporates teachings of the present invention may include a material consolidation system 200' which is configured to direct a focused beam of consolidating energy, such as a laser beam 220', into a chamber 110 of a fabrication tank 100 and onto selected locations of a surface 128 of a volume 124 of unconsolidated material 126 which is exposed to chamber 110.

When a laser beam 220' is employed as the consolidating energy, material consolidation system 200' includes a laser 210' of a known type that generates laser beam 220'. By way of example only, laser 210' may include a source 211' which is configured to generate light in the ultraviolet (UV) range of wavelengths of electromagnetic radiation. Laser 210' may also include one or more lenses 216 to focus a laser beam 220' that has been emitted by source 211' to a desired resolution. A location control element 212', such as a scan controller (e.g., a galvanometer) of a known type, may be associated with source 211' of laser 210' in such a way as to control the path of a laser beam 220' emitted from source 211' and, thus, to effect movement of laser beam 220'. The operation of location control element 212' and, thus, the movement of a laser beam 220', may be controlled by controller 700 or a processing element 205' (e.g., a processor or smaller group of logic circuits) which is dedicated for use with laser 210', in accordance with a CAD program and an accompanying CAD file for the object to be fabricated.

It is well known that the resolution of a laser beam 220' that is to be moved may be substantially maintained by keeping the path of laser beam 220' as constant (in this case, vertical) as possible. This may be done by increasing the path length of that laser beam 220' (e.g., to about twelve (12) feet). Nonetheless, it may not be practical for a stereolithography apparatus 10 (FIG. 1) that incorporates teachings of the present invention to include a laser 210' with a source 211' that is positioned a sufficient distance from surface 128 of volume 124 of unconsolidated material 126 that is to be selectively consolidated by laser beam 220'. Accordingly, laser 210' may also include a suitable mirror 214' or series of mirrors 214' that results in a nonlinear path for laser 210' to provide a desired path length L for laser beam 220' in a fixed amount of available space. As depicted, the area of mirror 214' may be large enough to substantially cover the entire cone of possible angles at which laser beam 220' may be directed by location control element 212' and, thus, to reflect laser beam 220' from every possible direction onto a corresponding location of surface 128.

Optionally, or as an alternative to the use of a location control element 212', the position and/or orientation of one or more of mirrors 214' may be moved, such as by an actuator 215' therefor (e.g., a motor). The operation of actuator 215' and, thus, the movement of a mirror 214' associated therewith, may be controlled by controller 700.

The size of the "spot" 222' of a laser beam 220' that impinges on surface 128 of unconsolidated material 126 to consolidate (e.g., cure) the same may be on the order of about 0.001 inch to about 0.008 inch across. It is currently preferred that, when laser beam 220' is moved across surface 128 (i.e., in the X-Y plane), the resolution of laser beam 220' be ±0.0003 inch over at least a 0.5 inch×0.25 inch field from a predetermined center point C on surface 128, thereby providing a high resolution scan across an area of at least 1.0 inch×0.5 inch. Of course, it is desirable to have substantially this high a resolution across the entirety of surface 128 to be scanned by laser beam 220', such area being termed the "field of exposure."

FIG. 7 depicts another exemplary embodiment of material consolidation system 200'', which is configured to direct unfocused, or blanket, consolidating energy 220'' in the form of electromagnetic radiation (e.g., light or a light beam) into a chamber 110 of a fabrication tank 100 and onto a surface 128 of a volume 124 of unconsolidated material 126 which is exposed to chamber 110.

A source 210'' of consolidating energy 220'' may remain in a fixed position as consolidating energy 220'' is introduced into chamber 110 or source 210'' may be moved, such as by an actuation system 217'' therefor. By way of example only, such an actuation system 217'' may comprise an X-Y plotter of a known type, which may operate and, thus, move source 210'' under the direction of signals, or carrier waves, that have been transmitted by controller 700 or by a processing element 205" (e.g., a processor or smaller group of logic circuits) that controls operation of machine consolidation system 200". Operation of source 210" may be under control of controller 700 or processing element 205".

Of course, when unconsolidated material 126 is nonselectively consolidated by consolidating energy 220" from source 210", a machine vision system 300 (FIGS. 1 and 2) is not employed at that time.

Machine Vision System

With returned reference to FIG. 1, a stereolithography apparatus 10 according to the present invention that employs a material consolidation system 200 (e.g., material consolidation system 200' shown in FIG. 6) which selectively consolidates material 126 may also include a machine vision system 300. It is currently preferred that the field of vision of machine vision system 300 be substantially coextensive with the field of exposure of a laser beam 220' (FIG. 6) or other consolidating energy 220 employed by a material consolidation system 200 to be used in conjunction with machine vision system 300.

Figure 8:
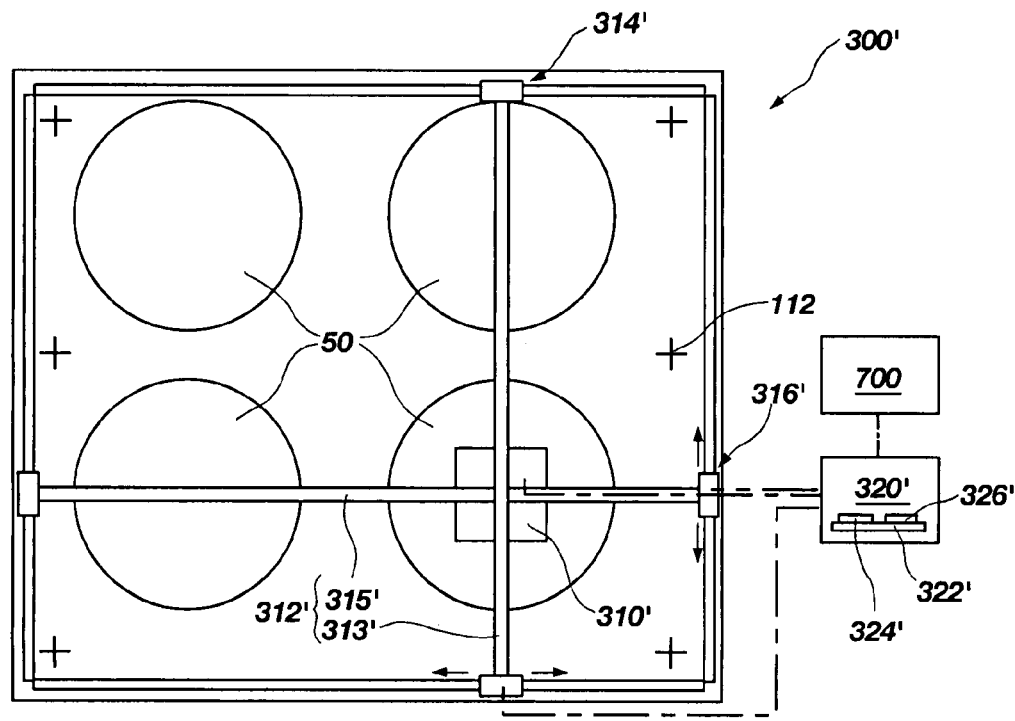
FIG. 8 schematically illustrates an exemplary embodiment of machine vision system that may be used with a fabrication tank of a stereolithographic apparatus according to the present invention, with the machine vision system being configured to move relative to a surface of unconsolidated material which is to be consolidated by the stereolithographic apparatus.
Figure 9:
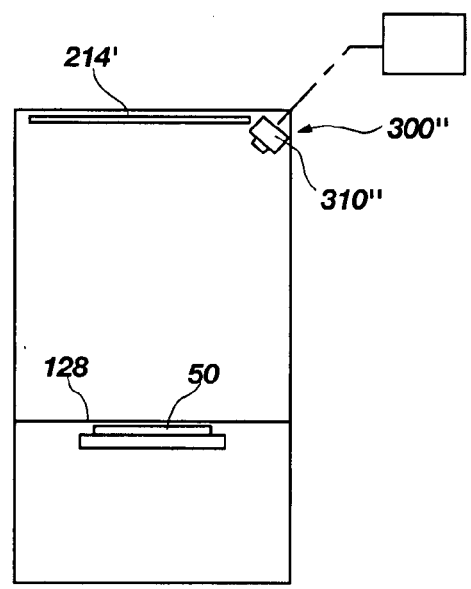
FIG. 9 is a schematic representation of another exemplary embodiment of machine vision system, which embodiment is configured to remain at a fixed location relative to a surface of unconsolidated material which is to be consolidated by a stereolithographic apparatus with which the machine vision system is used.

Examples of different types of machine vision systems 300 that may be used in accordance with teachings of the present invention are illustrated in FIGS. 8 and 9.

In FIG. 8, a scanning embodiment of machine vision system 300', or one which is configured to move relative to a chamber 110 of a fabrication tank 100 (FIGS. 1 and 2) with which it is used, is depicted. Machine vision system 300' includes a camera 310' which may be carried and moved over a fabrication substrate 50 by a scan element 312'. Scan element 312' positions camera 310' in close proximity to (e.g., inches from) surface 128 (FIG. 1) of volume 124 of unconsolidated material 126 (FIG. 1) so as to enable camera 310' to view minute features on a fabrication substrate 50 (e.g., bond pads, fuses, or other circuit elements of a semiconductor device) that are located at or near surface 128. Upon viewing fabrication substrate 50, camera 310' communicates information about the precise locations of such features (e.g., with an accuracy of up to about ±0.1 mil (i.e., 0.0001 inch)) to a computer 320' of machine vision system 300'.

Camera 310' may comprise any one of a number of commercially available cameras, such as CCD cameras or CMOS cameras available from a number of vendors. Of course, the image resolution of camera 310' should be sufficiently high as to enable camera 310' to view the desired features of fabrication substrate 50 and, thus, to enable computer 320' to precisely determine the positions of such features. In order to provide one or more reference points for the features that are viewed by camera 310', camera 310' may also "view" one or more fiducial marks 112 within a chamber 110 (FIG. 1) of a fabrication tank 100 (FIG. 1) with which machine vision system 300' is used.

Suitable electronic componentry, as required for adapting or converting the signals, or carrier waves, that are output by camera 310', may be incorporated in a board 322' installed in a computer 320'. Such electronic componentry may include one or more processors 324', other groups of logic circuits, or other processing or control elements that have been dedicated for use in conjunction with camera 310'. At least one processor 324', which may include a processor, another, smaller group of logic circuits, or other control element that has been dedicated for use in conjunction with camera 310', is programmed, as known in the art, to process signals that represent images that have been "viewed" by camera 310' and respond to such signals.

A self-contained machine vision system available from a commercial vendor of such equipment may be employed as machine vision system 300'. Examples of such machine vision systems and their various features are described, without limitation, in U.S. Pat. Nos. 4,526,646; 4,543,659; 4,736,437; 4,899,921; 5,059,559; 5,113,565; 5,145,099; 5,238,174; 5,463,227; 5,288,698; 5,471,310; 5,506,684; 5,516,023; 5,516,026; and 5,644,245. The disclosure of each of the immediately foregoing patents is hereby incorporated herein in its entirety by this reference. Such systems are available, for example, from Cognex Corporation of Natick, Mass. As an example, and not to limit the scope of the present invention, the apparatus of the Cognex BGA-IN-SPECTION PACKAGE™ or the SMD-PLACEMENT GUIDANCE PACKAGE™ may be adapted for use in a stereolithography apparatus 10 (FIG. 1) that incorporates teachings of the present invention, although it is currently believed that the MVS-8000™ product family and the Checkpoint® product line, the latter employed in combination with Cognex PATMAX™ software, may be especially suitable for use in the present invention.

A response by computer 320' may be in the form of instructions regarding the operation of a material consolidation system 200 (FIGS. 1 and 2), such as the selectively consolidating material consolidation system 200' shown in FIG. 6. These instructions may be embodied as signals, or carrier waves. By way of example only, such responsive instructions may be communicated to controller 700 of stereolithography apparatus 10, 10' (FIGS. 1 and 2, respectively) or directly to a processing element 205' (FIG. 6), such as a processor or group of processors, associated with a material consolidation system 200 (FIGS. 1 and 2) (e.g., material consolidation system 200' shown in FIG. 6) with which machine vision system 300' is used. Controller 700 or processing element 205' may, in turn, cause material consolidation system 200' to operate in such a way as to effect the stereolithographic fabrication of one or more objects on fabrication substrate 50 precisely at the intended locations thereof.

Due to the close proximity of camera 310' to surface 128 (FIG. 1), the field of vision of camera 310' is relatively small. In order to enable camera 310' to view a larger area of surface 128 than that which is "covered" by or located within the field of vision camera 310', a scan element 312' of a known type is configured to traverse camera 310' over at least part of the area of surface 128. Scan element 312' is also useful for moving camera 310' out of the path of any selectively consolidating energy being directed toward surface 128. By way of example only, scan element 312' may comprise an X-Y plotter or scanner of a known type. Generally, an X-Y plotter or scanner includes an x-axis element 313' and a y-axis element 315' that intersect one another. As depicted, camera 310' is carried by both x-axis element 313' and y-axis element 315' and, thus, is positioned at or near the location where x-axis element 313' and y-axis element 315' intersect one another.

X-axis element 313' and y-axis element 315' are both configured to move relative to and, thus, to position camera 310' at a plurality of locations over a fabrication substrate 50. Movement of x-axis element 313' is effected by an actuator 314' (e.g., a stepper motor and actuation system, such as a gear or wheel that moves x-axis element 313' along a track) that has been operatively coupled thereto, with actuator 314' being configured to cause x-axis element 313' to move laterally (i.e., perpendicular to the length thereof)

along a y-axis. Y-axis element 315' is operatively coupled to an actuator 316' therefor, which is configured to cause y-axis element 315' to move laterally along an x-axis. Actuators 314' and 316' may be configured to move their respective x-axis element 313' and y-axis element 315' in a substantially continuous fashion or in an incremental fashion. Movement of actuators 314' and 316' may be controlled by a processing element such as computer 320' or a scanning controller 326', such as a processor or smaller group of logic circuits, that is dedicated to operation of scan element 312' and which may communicate with computer 320' in such a way as to provide computer 320' with information as to the specific location of camera 310' relative to surface 128 (FIG. 1).

FIG. 9 shows an embodiment of machine vision system 300" that includes a camera 310" which is mounted or otherwise secured in a fixed position relative to surface 128 and may be maintained in a fixed position relative to a chamber 110 of a fabrication tank 100 (FIGS. 1 and 2) with which machine vision system 300" is to be used. By way of example only, camera 310" may be positioned in close proximity to a mirror 214' of material consolidation system 200' (FIG. 6) or at any other location which will provide camera 310" with a substantially unobstructed field of vision that covers the areas within which fabrication substrates 50 may be located.

Like camera 310', which is described in reference to FIG. 8, camera 310" may comprise a CCD camera, a CMOS camera, or any other suitable type of camera. As camera 310" is positioned farther away from a fabrication substrate 50 to be viewed thereby, however, camera 310" may have an effectively larger field of vision than camera 310'. Of course, suitable optical and/or digital magnification technology may be associated with camera 310" to provide the desired level of resolution. Further, although camera 310" may be locationally stationary, a suitable gimbals structure with rotational actuators may be employed to point camera 310" at a specific location in the field of exposure with little actual rotational movement. Thus, camera 310" may be used for both broad, or "macro," vision and viewing and inspection of miniature features.

While machine vision system 300" lacks a scan element, the remaining features thereof may be the same as and operate in the same or a similar manner to the corresponding features of machine vision system 300', which is described in reference to FIG. 8.

Cleaning Component

Figure 10:
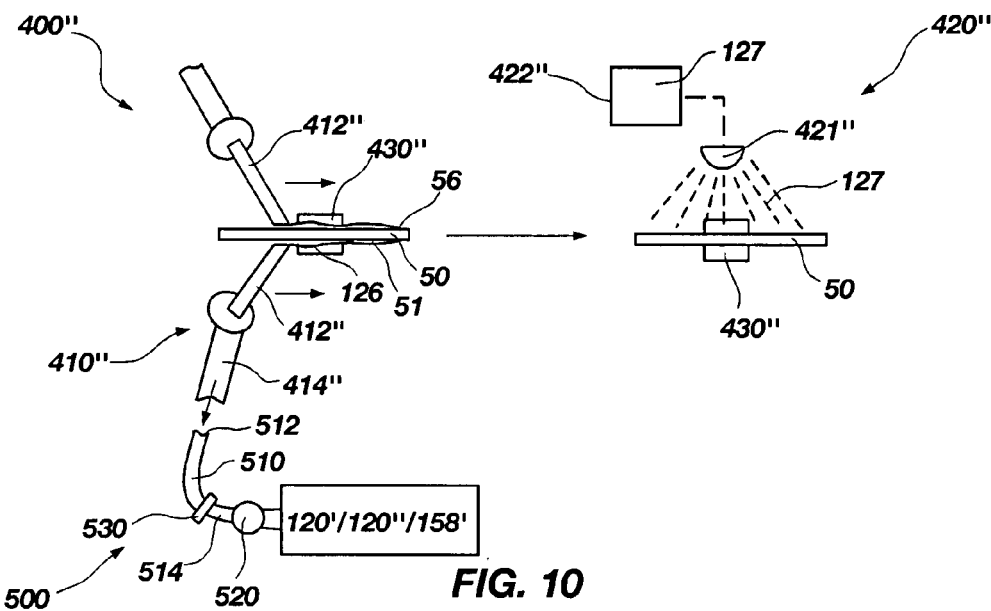
FIG. 10 is a schematic representation of another embodiment of cleaning component, as well as an exemplary embodiment of a material reclamation system.
Figure 11:
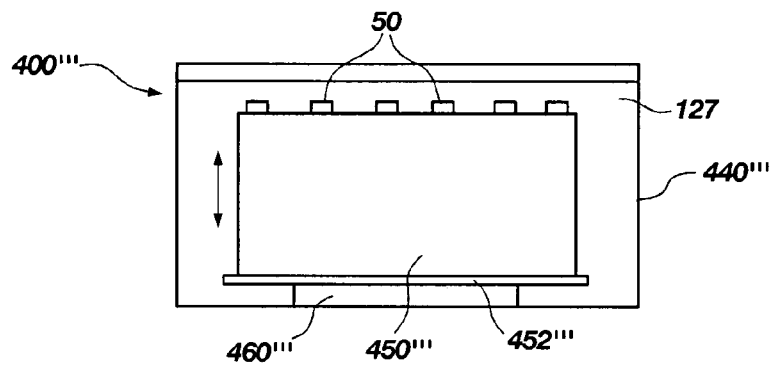
FIG. 11 is a schematic representation of yet another embodiment of cleaning component that may be used as part of a stereolithographic apparatus according to the present invention.

Exemplary embodiments of cleaning components 400 that may be used with a stereolithography apparatus 10 that incorporates teachings of the present invention, shown in FIG. 1, are depicted in FIGS. 4, 10, and 11.

The embodiment of cleaning component 400' shown in FIG. 4 is configured to be used with a fabrication tank 100" that is configured like the one shown in FIG. 4. Cleaning component 400' may include an initial material removal component 410' which is configured to remove excess unconsolidated material 126 from a fabrication substrate 50, an applicator 420' which is configured to introduce one or more cleaning agents 127 (e.g., water, solvents, detergents, etc.) onto at least an exposed surface of fabrication substrate 50, and a secondary material removal component 430' that removes cleaning agents 127 and any residual unconsolidated material 126 from fabrication substrate 50.

Initial material removal component 410' of cleaning component 400' comprises support system 130" of fabrication tank 100", as well as material reclamation zone 170" of chamber 110" and receptacle 172" of fabrication tank 100". Support system 130" and, in particular, actuation element 146" or rotation element 148" thereof, is configured to accelerate rotation of a fabrication substrate 50 carried thereby to a relatively high speed (e.g., about 50 to about 6,000 rpm) in such a way that any unconsolidated material 126 thereon will be forced therefrom under centrifugal force along substantially the same plane as that within which fabrication substrate 50 is located, into receptacle 172", and prevented from falling into reservoir 120".

Optionally, a protective cover 175 may be positioned beneath support element 132" and over surface 128 of volume 124 of unconsolidated material 126. Of course, protective cover 175 is configured to be placed in the appropriate location in such a way as to avoid contact with positioning element 140". Accordingly, protective cover 175 may include two or more sections 175a, 175b, one or more of which is configured to accommodate positioning element 140" upon being moved into position. Each section 175a, 175b of protective cover 175 may, for example, be moved into position in a hinged fashion (i.e., about hinges 177), as depicted, or by horizontally sliding each section 175a, 175b into position. In order to move protective cover 175 into position, it may be operably coupled with an actuator 176 (e.g., a motor). Operation of actuator 176 and, thus, movement of protective cover 175 may be directed by controller 700 or by a processing element 178, such as a processor or smaller group of logic circuits, that is dedicated for use with cleaning component 400'.

As an alternative to forcing excess unconsolidated material 126 which is removed from fabrication substrate 50 into receptacle 172" by rotating, or spinning, unconsolidated material 126 may be caused to fall into reservoir 120" and, thus, captured directly thereby.

Once excess unconsolidated material 126 has been substantially removed from fabrication substrate 50, positioning element 140" is moved to raise support element 132" from material reclamation zone 170" to cleaning zone 180".

By way of example only, applicator 420' may comprise a fixed or movable high-pressure spray nozzle or group of nozzles that form a spray head 421', which is in flow communication with a source 422' of cleaning agent 127 (e.g., water, solvents for unconsolidated material 126, detergents, etc.). Applicator 420' is configured to be oriented so as to direct one or more cleaning agents 127 into chamber 110" of fabrication tank 100" and onto an exposed surface of a fabrication substrate 50 that is carried by support system 130" and located within cleaning zone 180" of chamber 110".

Applicator 420' may be located in a fixed position relative to fabrication tank 100" or carried by a movable element 424', such as a robotic arm, which is configured to position applicator 420' so as to orient the same toward fabrication substrate 50, as depicted in FIG. 4.

Controller 700 or one or more dedicated processing elements 426' (e.g., a processor, a smaller group of logic circuits, etc.) that communicate with controller 700, may communicate with applicator 420' and its associated movable element 424', if any. Accordingly, operation of applicator 420', including, without limitation, the orientation of spray head 421' and the application of cleaning agent 127 onto a surface of fabrication substrate 50, may be performed under the direction of either controller 700 or a dedicated processing element 426'.

Like initial material removal component 410', secondary material removal component 430' of cleaning component 400' includes support system 130" of fabrication tank 100". In addition, secondary material removal component 430' includes cleaning zone 180" and receptacle 182" thereof of chamber 110". Support system 130" and, in particular, actuation element 146" or rotation element 148" thereof, is configured to accelerate rotation of a fabrication substrate 50 carried thereby to a sufficiently high speed (e.g., about 50 to about 6,000 rpm) so that any cleaning agents 127 or unconsolidated material 126 thereon will be forced therefrom along substantially the same plane as that within which fabrication substrate 50 is located, into receptacle 172", and prevented from falling into reservoir 120".

Optionally, positive air pressure, which may be supplied by use of a so-called "air knife," such as that depicted and described in reference to FIG. 11, may be positioned over each fabrication substrate 50 following the cleaning process to dry any residual cleaning agents 127 therefrom.

A variation of cleaning component 400' does not comprise part of a fabrication tank 100" but, rather, is separate therefrom so as to completely avoid the potential for contamination of unconsolidated material 126 within reservoir 120" with excess unconsolidated material 126 being removed from fabrication substrate 50 with cleaning agents 127.

Turning now to FIG. 10, another exemplary embodiment of cleaning component 400" is depicted. Cleaning component 400" includes a material removal component 410" and a wash element 420", as well as a support element 430" upon which one or more fabrication substrates 50 are supported while material removal component 410" and wash element 420" perform their intended tasks.

Material removal component 410", which is positioned external to fabrication tank 100", may comprise one or more removal heads 412", through which either a negative pressure (e.g., a vacuum) or a positive pressure (e.g., about 30 psi (which is typically not sufficient to puncture the skin of an operator of stereolithography apparatus 10, 10') or higher pressures may be used and delivered by a so-called "air knife," such as that manufactured by Secomak Ltd. of Middlesex, United Kingdom, at a sufficient velocity to overcome the adhesion of unconsolidated material 126 from fabrication substrate 50 and, thus, remove unconsolidated material 126 from fabrication substrate 50) may be applied to a fabrication substrate 50. Each removal head 412" may be supported by a positioning element 414", such as a robotic arm. Positioning element 414" places removal head 412" in sufficient proximity to one or more surfaces of a fabrication substrate 50 so that a negative pressure (e.g., a vacuum) or positive pressure applied to fabrication substrate 50 by removal head 412" may respectively draw any excess unconsolidated material 126 on fabrication substrate 50 into removal head 412" or blow any excess unconsolidated material 126 from fabrication substrate 50. Alternatively, support element 430" may be transported so as to move fabrication substrate 50 in proximity to one or more removal heads 412". Material removal component 410" may be used in combination with a bulk removal process, such as tipping or inverting a fabrication substrate 50 to permit unconsolidated material 126 to flow therefrom.

As fabrication substrate 50 is brought in proximity to wash element 420" or wash element 420" is brought into proximity to fabrication substrate 50, support element 430" may remain secured to fabrication substrate 50. As shown, wash element 420" may include one or more spray heads 421" that communicate with a source 422" of cleaning agent 127 and which may be oriented to direct cleaning agent 127 onto fabrication substrate 50.

Any cleaning agent 127 that remains on fabrication substrate 50 may be removed therefrom by way of one or more removal heads 412", which may include at least one removal head 412" that was used to remove excess unconsolidated material 126 from fabrication substrate 50 or a different removal head 412".

Another embodiment of cleaning component 400''' that may be used in a stereolithography apparatus 10, 10' (FIGS. 1 and 2, respectively) according to the present invention is shown in FIG. 11. Cleaning component 400''' includes a tank 440''' which is at least partially filled with one or more cleaning agents 127 and within which one or more fabrication substrates 50 may be introduced, such as by the illustrated wafer boat 450'''. Additionally, cleaning component 400''' may include an agitation system 460''', which facilitates the removal of residual unconsolidated material 126 from fabrication substrates 50. By way of example only, agitation system 460''' may include a vertical agitation system, which repeatedly moves a support 452''' upon which wafer boat 450''' is carried up and down.

As another alternative, a rotary wash system (not shown), such as that available from Semitool of Kalispel, Mont., may be used to remove any residual unconsolidated material from one or more fabrication substrates.

Material Reclamation System

Again referring to FIGS. 4 and 10, an exemplary embodiment of material reclamation system 500, shown in FIG. 1, is illustrated.

As depicted in FIG. 4, material reclamation system 500 includes a collection conduit 510 which includes a first end 512 that communicates with receptacle 172" of cleaning component 400' so as to receive excess unconsolidated material 126 which has been collected by receptacle 172". When used with the embodiment of cleaning component 400" that is shown in FIG. 10, first end 512 of collection conduit 510 communicates with material removal component 410", such as a negative pressure head, so as to collect excess unconsolidated material 126 that has been drawn into material removal component 410".

The opposite, second end 514 of collection conduit 510 communicates with either reservoir 120', 120", as shown, or an external reservoir 158' (FIG. 3C) in communication therewith. Accordingly, unconsolidated material 126 may be returned to reservoir 120', 120", or 158' through collection conduit 510.

One or more filters 530, which are configured to permit the passage of unconsolidated material 126 therethrough while trapping particulate contaminants that are larger than a selected size, may also be positioned along the length of collection conduit 510 or at an end 512, 514 thereof.

One or more pumps 520 (e.g., peristaltic pumps) may communicate with collection conduit 510, each applying either a positive or negative pressure thereto, to facilitate the transport of unconsolidated material 126 therethrough, as well as the return of unconsolidated material 126 to reservoir 120', 120", 158' through conduit 510.

Calibration of the Programmed Material Consolidation Apparatus

Figure 12:
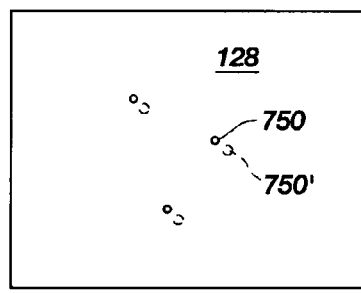
FIG. 12 is a schematic representation of the manner in which the locations at which a layer of unconsolidated material is selectively consolidated may be calibrated with a machine vision system of a stereolithographic apparatus of the present invention.

With returned reference to FIGS. 1, 2, and 6, as well as with reference to FIG. 12, machine vision system 300 (e.g., either a movable machine vision system 300', such as that shown in FIG. 8, or a stationary machine vision system 300", such as that shown in FIG. 9) may be used to calibrate stereolithography apparatus 10, 10' and, more particularly, material consolidation system 200 (e.g., the selective material consolidation system 200' shown in FIG. 6) thereof. Various types of calibration may be effected, including, but not limited to, calibration of the position (X-Y) at which a selectively consolidating energy, such as laser beam 220', impinges upon surface 128 of volume 124 of unconsolidated material 126, calibration of the magnification of machine vision system 300 and required movement of the selectively consolidating energy to effect fabrication of a structure of desired dimensions, and calibration of the "squareness" of a grid of locations at which the selectively consolidating energy impinges upon surface 128.

The position at which selectively consolidating energy impinges upon surface 128 may, by way of example only, be calibrated by selectively consolidating unconsolidated material 126 at one or more calibration locations, each of which is referred to herein as a "reference pixel" 750, on surface 128. Next, each reference pixel 750 is "viewed" by machine vision system 300 to locate the same relative to a reference grid (not shown), which may be stored in memory of either computer 320' (FIG. 8) or controller 700 (FIG. 1). The location at which each reference pixel 750 actually appears is then compared with the anticipated location 750' for reference pixel 750. Material consolidation system 200, the reference grid, or a combination of both may then be adjusted, as known in the art, to compensate for any difference between anticipated location 750' and the actual location of reference pixel 750.

The magnification with which a movable machine vision system 300', such as that shown in FIG. 8, views objects that are located within or exposed to chamber 110 may be determined by moving camera 310' a fixed distance and determining the number of reference pixels 750 that are "viewed" (e.g., as changes in contrast sensed by camera 310') as camera 310' is moved. For example, if camera 310' is moved a linear distance of 10 mils (i.e., 0.010 inch) and twenty (20) pixel widths (e.g., ten (10) pixels, each positioned one pixel width apart from each other) are detected (e.g., as nineteen (19) changes, or transitions, in contrast), camera 310' is magnifying a viewed image by a value which equates to a 20:1 pixels-per-mil ratio. This process may then be repeated at least once to check the measured magnification of camera 310'. Knowledge of the pixel-to-mil ratio is useful for controlling the movement of selectively consolidating energy, such as by controlling operation of a location control element 212' (e.g., pulsing of a stepper motor that moves a galvanometer that moves a laser beam 220' (FIG. 6).

A calibration plate (not shown) of a known type, which, of course, is configured specifically for the type of apparatus to be calibrated, may be used to determine the magnification with which a fixed camera 310" of machine vision system 300", shown in FIG. 9, views objects that are located within or exposed to chamber 110. The calibration plate, which is also referred to as a "prime standard," includes features of known dimensions and locations. These known dimensions may be compared, as known in the art, with the image viewed by camera 310" to determine the degree to which an image of these features is magnified or demagnified by camera 310".

The linearity with which selectively consolidating energy impinges upon surface 128 across the field of exposure of material consolidation system 200' may be determined and calibrated by determining the actual locations 760 (FIG. 13), particularly at the corners and edges of a rectangular field of exposure, at which selectively consolidating energy, such as laser beam 220', impinges on surface 128. The actual locations 760 at which the selectively consolidating energy impinges on surface 128 may then be compared to locations 760' (FIG. 13) that are anticipated if the selectively consolidating energy were impinging on surface 128 in a linear path. Responsive to this comparison, movement of the selectively consolidating energy may be adjusted, or calibrated, in such a way as to increase the linearity of the path along which the selectively consolidating energy impinges on surface 128 and, thus, the accuracy with which the selectively consolidating energy impinges on surface 128, particularly at the corners and edges of the field of exposure. In the example of a laser beam 220', adjustments in the movement thereof may be effected by adjustments in the manner in which location control element 212' (FIG. 6), such as a pair of galvanometers, are moved.

Figure 13:
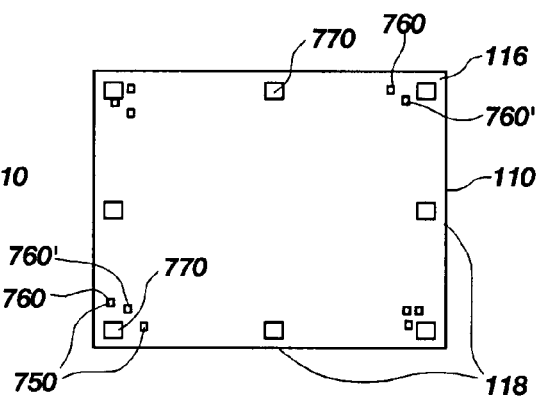
FIG. 13 is a top view of a fabrication tank, depicting an exemplary manner in which a linearity calibration may be conducted.

With reference to FIG. 13, such linearity calibration may be effected by positioning light-sensitive elements 770, such as phototransistors, CCD arrays, or CMOS arrays, at selected locations within chamber 110, such as at the four corners 116 thereof and along the edges 118 thereof, midway between two corners 116. Alternatively, a light-sensitive plate (not shown) of a known type (e.g., a large phototransistor, CCD array, or CMOS array) may be positioned within chamber 110 at an elevation which is substantially the same as that at which surface 128 (FIG. 6) is to be maintained during stereolithographic fabrication. As another alternative, reference pixels 750 may be formed by use of material consolidation system 200' (FIG. 6) and viewed by machine vision system 300, 300', 300" (FIGS. 1, 2, 8, and 9).

Use of the Programmed Material Consolidation Apparatus

In reference again to FIGS. 1 and 2, as well as to FIG. 14, an example of the use of a programmed material consolidation apparatus, such as stereolithography apparatus 10, 10', that incorporates teachings of the present invention is described.

In order to stereolithographically fabricate one or more objects 20, corresponding data from the .stl files, which comprise a 3-D CAD simulation or model, resident in memory (e.g., random-access memory (RAM)) associated with controller 700 are processed by controller 700. The data, which mathematically represents the one or more objects to be fabricated, may be divided into subsets, each subset representing a layer 22, or "slice," of the object 20. The division of data may be effected by mathematically sectioning the 3-D CAD model into at least one layer 22, a single layer or a "stack" of such layers 22 representing the object 20. Each slice may be from about 0.0001 inch to about 0.0180 inch thick. A thinner slice promotes higher resolution by enabling better reproduction of fine vertical surface features of the object or objects to be fabricated.

Before fabrication of a first layer 22a of an object 20 is commenced, the operational parameters for stereolithography apparatus 10, 10' may be set to adjust the size (diameter if circular) of selectively consolidating energy (e.g., laser beam 220' shown in FIG. 6), if such is used to at least partially consolidate unconsolidated material 126.

In addition, controller 700 may automatically check and, if necessary, adjust by means known in the art the elevation, or level, of surface 128 of volume 124 of unconsolidated material 126 to maintain the same at an appropriate focal length for laser beam 220'. U.S. Pat. No. 5,174,931, the disclosure of which is hereby incorporated herein in its entirety by this reference, discloses an example of a suitable level control system. Alternatively, the height of a mirror 214' (FIG. 6) that reflects laser beam 220' onto an appropriate location of surface 128 may be adjusted responsive to a detected elevation of surface 128 to cause the focal point of laser beam 220' to be located precisely at surface 128, although this approach is more complex.

A support system 130, 130', 130", 130''' upon which one or more fabrication substrates 50 (e.g., semiconductor substrates 52) are carried may then be submerged in unconsolidated material 126 within reservoir 120, 120', 120" to a depth equal to the thickness of one layer 22 or slice of the object 20 to be formed so as to form a layer 22' of unconsolidated material 126 on fabrication substrate 50. The elevation of surface 128 may subsequently be readjusted, as required to accommodate any differences between unconsolidated material 126 and consolidated material 126'. Alternatively, a layer 22' of unconsolidated material 126 may be disposed onto an exposed upper surface 56 of fabrication substrate 50.

A machine vision system 300, 300', 300" (FIGS. 1 and 2, 8, and 9, respectively) may then be used to view fabrication substrate 50 and to identify each location thereof over which an object 20 is to be fabricated.

Laser 210' (FIG. 6) may then be activated so laser beam 220' will scan surface 128 of volume 124 of unconsolidated material 126 so as to at least partially consolidate (e.g., polymerize to an at least semisolid state) the same, thereby defining boundaries of a layer 22 of object 20 and filling in solid portions thereof. Support system 130, 130', 130", 130''' may then be lowered to lower fabrication substrate 50 a distance that is substantially equal to the desired thickness of the next layer 22 of object 20 to be fabricated thereover, and the selective consolidation process repeated, as often as necessary, layer by layer, until each object 20 is completed. Of course, the number of layers 22 that are required to form object 20 may depend upon the height of object 20 and the desired thickness for each layer 22 thereof. Different layers 22 of a stereolithographically fabricated object 20 may have different thicknesses.

If desired, an uppermost layer 22U' of unconsolidated material 126 may be planarized, for example, by use of a planarizing element 195, such as that described in reference to FIG. 4B. Planarizing elements 195 are particularly useful when one or more layers 22' of unconsolidated material 126 are dispensed over fabrication substrate 50 rather than being formed thereover by submersion.

With continued reference to FIG. 14, as well as to FIG. 7, unconsolidated material 126 of layer 22' may be consolidated with less selectivity by exposing layer 22' to laser beam 220' which has been emitted from laser 210' (not shown).

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed:

1. A method for calibrating a programmable material consolidation apparatus, comprising:
    viewing at least one location of a fabrication site of the programmable material consolidation apparatus substantially at a consolidation elevation of the fabrication site, from a location above the consolidation elevation, while moving a viewpoint from which viewing is effected along a path of a plurality of spaced apart reference pixels, each having a common, known dimension;
    evaluating data obtained from viewing the at least one location; and
    determining an amount of adjustment to be made to at least one component of the programmable material consolidation apparatus, in response to the act of evaluating.

2. The method of claim 1, wherein viewing is effected substantially at the consolidation elevation.

3. The method of claim 1, wherein evaluating comprises comparing the data to at least one expected data value.

4. The method of claim 1, wherein determining comprises determining that no adjustment of the at least one component need be made.

5. The method of claim 1, further comprising:
    adjusting the at least one component by the amount of adjustment.

6. The method of claim 1, further comprising:
    adjusting the at least one component of the programmable material consolidation apparatus by at least a portion of the amount of adjustment.

7. The method of claim 1, further comprising:
    fabricating at least one feature substantially at the consolidation elevation.

8. The method of claim 7, wherein viewing comprises viewing the at least one feature.

9. The method of claim 8, wherein fabricating includes fabricating a plurality of reference pixels substantially at the consolidation elevation.

10. The method of claim 9, wherein evaluating data comprises comparing actual locations of the plurality of reference pixels to anticipated locations for the plurality of reference pixels.

11. The method of claim 10, further comprising:
    adjusting reference grid data by at least a portion of the amount of adjustment.

12. The method of claim 10, further comprising:
    adjusting a material consolidation element of the programmable material consolidation apparatus by at least a portion of the amount of adjustment.

13. The method of claim 12, further comprising:
    adjusting reference grid data by at least a portion of the amount of adjustment.

14. The method of claim 1, further comprising:
    positioning a calibration plate including the plurality of spaced apart reference pixels substantially at the consolidation elevation.

15. The method of claim 1, wherein moving is effected substantially linearly.

16. The method of claim 1, wherein viewing further comprises detecting transitions in contrast.

17. The method of claim 1, wherein viewing further comprises determining a number of reference pixels viewed as the viewpoint is moved a particular distance.

18. The method of claim 17, wherein evaluating data comprises evaluating the particular distance, the number of reference pixels viewed, and the common, known dimension of the reference pixels to determine a magnification at the viewpoint.

19. The method of claim 18, further comprising:
repeating the acts of moving, viewing, and evaluating at least once to verify the magnification at the viewpoint.

20. The method of claim 18, further comprising:
using the magnification at the viewpoint to control operation of a material consolidation element of the programmable material consolidation apparatus.

21. The method of claim 1, further comprising:
directing selectively consolidating energy toward a plurality of locations of the consolidation elevation.

22. The method of claim 21, wherein directing includes directing the selectively consolidating energy toward at least one location proximate a corner or an edge of a rectangular field of exposure at the consolidation elevation.

23. The method of claim 21, wherein at least some of the plurality of locations are in substantially linear alignment.

24. The method of claim 21, wherein viewing comprises viewing actual locations of the consolidation elevation to which the selectively consolidating energy is directed.

25. The method of claim 24, further comprising:
placing at least one light-sensitive element substantially at the consolidation elevation, the viewing being effected with the at least one light-sensitive element.

26. The method of claim 24, wherein evaluating data comprises comparing the actual locations to anticipated locations of the consolidation elevation where selectively consolidating energy was expected to be directed.

27. The method of claim 21, further comprising:
adjusting a material consolidation element of the programmable material consolidation apparatus by at least a portion of the adjustment amount to increase a linearity of a path of consolidating energy generated by the material consolidation element.

* * * * *